United States Patent
Jenson et al.

(10) Patent No.: US 7,603,144 B2
(45) Date of Patent: *Oct. 13, 2009

(54) ACTIVE WIRELESS TAGGING SYSTEM ON PEEL AND STICK SUBSTRATE

(75) Inventors: Mark L. Jenson, Zimmerman, MN (US); Jody J. Klaassen, Minneapolis, MN (US); Jim Sullivan, Fairport, NY (US)

(73) Assignee: Cymbet Corporation, Elk River, MN (US)

( * ) Notice: Subject to any disclaimer, the term of this patent is extended or adjusted under 35 U.S.C. 154(b) by 1270 days.

This patent is subject to a terminal disclaimer.

(21) Appl. No.: 10/336,662

(22) Filed: Jan. 2, 2003

(65) Prior Publication Data

US 2004/0131897 A1   Jul. 8, 2004

(51) Int. Cl.
*H04B 1/38* (2006.01)
*H04M 1/00* (2006.01)

(52) U.S. Cl. .................. 455/573; 455/572; 455/574; 429/5; 429/7; 429/127

(58) Field of Classification Search ........ 455/572–574, 455/522; 370/256; 429/7, 162, 322, 5, 127
See application file for complete search history.

(56) References Cited

U.S. PATENT DOCUMENTS

| | | | |
|---|---|---|---|
| 3,419,487 A | 12/1968 | Robbins et al. | |
| 4,207,119 A | 6/1980 | Tyan | 136/89 TF |
| 4,299,890 A | 11/1981 | Rea et al. | |
| 4,328,262 A | 5/1982 | Kurahashi et al. | |
| 4,333,808 A | 6/1982 | Bhattacharyya et al. | |
| 4,353,160 A | 10/1982 | Armini et al. | |
| 4,365,107 A | 12/1982 | Yamauchi | |

(Continued)

FOREIGN PATENT DOCUMENTS

DE   19948742   12/2000

(Continued)

OTHER PUBLICATIONS

Dobley, Arthus, et al., "High Capacity Cathodes for Lithium-Air Batteries", Yardney Technical Products, Inc./Lithion, Inc. Pawcatuck, CT Electrochemical Society Conference,(May 20, 2004).

(Continued)

*Primary Examiner*—Nay A Maung
*Assistant Examiner*—Tuan H Nguyen
(74) *Attorney, Agent, or Firm*—Charles A. Lemaire; Lemaire Patent Law Firm, P.L.L.C.

(57) ABSTRACT

A radio frequency identification (RFID) device provided on a thin-film battery. A system includes the RFID device in communication with a remote radio frequency (RF) transmitter and/or receiver. In some embodiments, the RFID device of the system includes a flexible substrate, a thin-film battery deposited on the flexible substrate, an electronic circuit placed on the battery and coupled to the battery to provide power, and a Radio Frequency (RF) antenna connected to the electronic circuit. In some embodiments, the battery of the RFID device is a rechargeable battery, and the battery is recharged when energy is transmitted from the remote device. Another aspect of the invention provides a system for making an RFID device.

13 Claims, 14 Drawing Sheets

U.S. PATENT DOCUMENTS

| | | | |
|---|---|---|---|
| 4,435,445 A | 3/1984 | Allred et al. | |
| 4,440,108 A | 4/1984 | Little et al. | 118/719 |
| 4,481,265 A | 11/1984 | Ezawa et al. | |
| 4,520,039 A | 5/1985 | Ovshinsky | |
| 4,539,660 A | 9/1985 | Miyauchi et al. | |
| 4,633,129 A | 12/1986 | Cuomo et al. | 313/153 |
| 4,645,726 A | 2/1987 | Hiratani et al. | 429/191 |
| 4,684,848 A | 8/1987 | Kaufman et al. | 315/111.81 |
| 4,696,671 A | 9/1987 | Epstein et al. | |
| 4,730,383 A | 3/1988 | Balkanski | |
| 4,740,431 A | 4/1988 | Little | |
| 4,798,574 A | 1/1989 | Marsik | |
| 4,832,463 A | 5/1989 | Goldner et al. | |
| 4,862,032 A | 8/1989 | Kaufman et al. | 313/359.1 |
| 5,017,550 A | 5/1991 | Shioya et al. | 505/1 |
| 5,022,930 A | 6/1991 | Ackerman et al. | 136/251 |
| 5,051,274 A | 9/1991 | Goldner et al. | |
| 5,064,520 A | 11/1991 | Miyake et al. | 204/192.11 |
| 5,089,104 A | 2/1992 | Kanda et al. | 204/192.11 |
| 5,098,737 A | 3/1992 | Collins et al. | 427/53.1 |
| 5,115,378 A | 5/1992 | Tsuchiya et al. | 361/502 |
| 5,126,031 A | 6/1992 | Gordon et al. | |
| 5,151,848 A | 9/1992 | Finello | |
| 5,166,009 A | 11/1992 | Abraham et al. | |
| 5,171,413 A | 12/1992 | Arntz et al. | |
| 5,180,645 A | 1/1993 | More | |
| 5,189,550 A | 2/1993 | Goldner et al. | |
| 5,192,947 A | 3/1993 | Neustein | |
| 5,202,196 A | 4/1993 | Wang et al. | 429/86 |
| 5,202,201 A | 4/1993 | Meunier et al. | |
| 5,261,968 A | 11/1993 | Jordan | 136/244 |
| 5,273,837 A | 12/1993 | Aitken et al. | 249/30 |
| 5,296,122 A | 3/1994 | Katsube et al. | 204/298.04 |
| 5,314,765 A | 5/1994 | Bates | 429/194 |
| 5,338,625 A | 8/1994 | Bates et al. | |
| 5,348,703 A | 9/1994 | Bishop et al. | 420/590 |
| 5,393,572 A | 2/1995 | Dearnaley | 427/523 |
| 5,411,592 A | 5/1995 | Ovshinsky et al. | |
| 5,415,717 A | 5/1995 | Perneborn | |
| 5,425,966 A | 6/1995 | Winter et al. | |
| 5,426,561 A | 6/1995 | Yen et al. | |
| 5,433,096 A | 7/1995 | Janssen et al. | |
| 5,445,126 A | 8/1995 | Graves | |
| 5,445,906 A | 8/1995 | Hobson et al. | 429/162 |
| 5,448,110 A | 9/1995 | Tuttle et al. | |
| 5,449,994 A | 9/1995 | Armand et al. | 320/14 |
| 5,455,126 A | 10/1995 | Bates et al. | 429/127 |
| 5,468,521 A | 11/1995 | Kanai et al. | |
| 5,482,611 A | 1/1996 | Helmer et al. | 204/298.17 |
| 5,494,762 A | 2/1996 | Isoyama et al. | |
| 5,501,175 A | 3/1996 | Tanaka et al. | 117/108 |
| 5,501,924 A | 3/1996 | Swierbut et al. | 429/224 |
| 5,510,209 A | 4/1996 | Kuzhikalail et al. | |
| 5,512,147 A | 4/1996 | Bates et al. | 204/192.15 |
| 5,523,179 A | 6/1996 | Chu | |
| 5,528,222 A | 6/1996 | Moskowitz et al. | 340/572 |
| 5,529,671 A | 6/1996 | Debley et al. | 204/192.34 |
| 5,536,333 A | 7/1996 | Foote et al. | 136/260 |
| 5,549,989 A | 8/1996 | Anani | |
| 5,558,953 A | 9/1996 | Matsui et al. | |
| 5,561,004 A | 10/1996 | Bates et al. | 429/162 |
| 5,567,210 A | 10/1996 | Bates et al. | 29/623.5 |
| 5,569,520 A | 10/1996 | Bates | 429/162 |
| 5,569,564 A | 10/1996 | Swierbut et al. | 424/224 |
| 5,571,749 A | 11/1996 | Matsuda et al. | |
| 5,582,623 A | 12/1996 | Chu | |
| 5,585,999 A | 12/1996 | De Long et al. | 361/505 |
| 5,593,551 A | 1/1997 | Lai | 204/192.12 |
| 5,597,660 A | 1/1997 | Bates et al. | 429/191 |
| 5,599,644 A | 2/1997 | Swierbut et al. | 429/224 |
| 5,601,652 A | 2/1997 | Mullin et al. | 118/723 EB |
| 5,612,152 A | 3/1997 | Bates et al. | 429/152 |
| 5,626,976 A | 5/1997 | Blanton et al. | |
| 5,644,207 A | 7/1997 | Lew et al. | |
| 5,654,084 A | 8/1997 | Egert | 428/215 |
| 5,654,111 A | 8/1997 | Minomiya et al. | |
| 5,686,201 A | 11/1997 | Chu | |
| 5,695,873 A | 12/1997 | Kumar et al. | |
| 5,695,885 A | 12/1997 | Malhi | |
| 5,700,281 A * | 12/1997 | Brewer et al. | 607/5 |
| 5,705,293 A | 1/1998 | Hobson | 429/162 |
| 5,714,404 A | 2/1998 | Mitlitsky et al. | |
| 5,763,058 A | 6/1998 | Isen et al. | |
| 5,789,108 A | 8/1998 | Chu | |
| 5,814,420 A | 9/1998 | Chu | |
| 5,830,331 A | 11/1998 | Kim et al. | 204/192.15 |
| 5,849,426 A | 12/1998 | Thomas et al. | |
| 5,863,337 A | 1/1999 | Neuman et al. | 118/718 |
| 5,868,914 A | 2/1999 | Landsbergen et al. | 204/298.06 |
| 5,872,080 A | 2/1999 | Arendt et al. | |
| 5,914,507 A | 6/1999 | Polla et al. | |
| 5,925,483 A | 7/1999 | Kejha et al. | |
| 5,932,284 A | 8/1999 | Reynolds | |
| 5,935,727 A | 8/1999 | Chiao | 429/32 |
| 5,953,677 A | 9/1999 | Sato | |
| 5,973,598 A * | 10/1999 | Beigel | 340/572.1 |
| 5,978,207 A | 11/1999 | Anderson et al. | |
| 5,981,107 A | 11/1999 | Hamano et al. | 429/231.95 |
| 5,982,284 A | 11/1999 | Baldwin et al. | |
| 5,995,006 A | 11/1999 | Walsh | 340/572.7 |
| 6,001,715 A | 12/1999 | Manka et al. | |
| 6,002,208 A | 12/1999 | Maishev et al. | 315/111.9 |
| 6,023,610 A | 2/2000 | Wood, Jr. | |
| 6,025,094 A | 2/2000 | Visco et al. | |
| 6,033,471 A | 3/2000 | Nakanishi et al. | 117/108 |
| 6,037,717 A | 3/2000 | Maishev et al. | 315/111.91 |
| 6,042,687 A | 3/2000 | Singh et al. | 156/345 |
| 6,056,857 A | 5/2000 | Hunt et al. | 204/192.15 |
| 6,059,847 A | 5/2000 | Farahmandi et al. | 29/25.03 |
| 6,077,621 A | 6/2000 | Allen et al. | |
| 6,078,791 A | 6/2000 | Tuttle et al. | |
| 6,086,962 A | 7/2000 | Mahoney et al. | 427/577 |
| 6,094,292 A | 7/2000 | Goldner et al. | |
| 6,103,412 A | 8/2000 | Hirano et al. | 429/24 |
| 6,110,620 A | 8/2000 | Singh et al. | 429/223 |
| 6,130,507 A | 10/2000 | Maishev et al. | 315/111.81 |
| 6,133,159 A | 10/2000 | Vaartstra et al. | 438/758 |
| 6,136,165 A | 10/2000 | Moslehi | 204/298.06 |
| 6,139,964 A | 10/2000 | Sathrum et al. | 428/408 |
| 6,147,354 A | 11/2000 | Maishev et al. | 250/423 R |
| 6,153,067 A | 11/2000 | Maishev et al. | 204/298.04 |
| 6,163,260 A | 12/2000 | Conwell et al. | |
| 6,168,884 B1 | 1/2001 | Neudecker et al. | |
| 6,175,196 B1 | 1/2001 | Ragner et al. | |
| 6,181,237 B1 | 1/2001 | Gehlot | |
| 6,181,545 B1 | 1/2001 | Amatucci et al. | 361/502 |
| 6,203,944 B1 | 3/2001 | Turner et al. | 429/218.1 |
| 6,220,516 B1 | 4/2001 | Tuttle et al. | |
| 6,222,117 B1 | 4/2001 | Shiozaki | |
| 6,236,061 B1 | 5/2001 | Walpita | |
| 6,238,813 B1 | 5/2001 | Maile et al. | |
| 6,264,709 B1 | 7/2001 | Yoon et al. | |
| 6,277,523 B1 | 8/2001 | Giron | 429/304 |
| 6,280,875 B1 | 8/2001 | Kwak et al. | |
| 6,281,795 B1 | 8/2001 | Smith et al. | |
| 6,294,722 B1 | 9/2001 | Kondo et al. | |
| 6,327,909 B1 | 12/2001 | Hung et al. | |
| 6,391,664 B1 | 5/2002 | Goruganthu et al. | |
| 6,399,489 B1 | 6/2002 | M'Saad et al. | |
| 6,402,795 B1 | 6/2002 | Chu et al. | |
| 6,402,796 B1 | 6/2002 | Johnson | |
| 6,413,675 B1 | 7/2002 | Harada et al. | |
| 6,432,577 B1 | 8/2002 | Shul et al. | |
| 6,475,854 B2 | 11/2002 | Narwankar et al. | 438/238 |

| | | | |
|---|---|---|---|
| 6,558,836 B1 | 5/2003 | Whitacre et al. | |
| 6,576,365 B1 | 6/2003 | Meitav et al. | |
| 6,576,369 B1 | 6/2003 | Moriguchi et al. | 429/231.8 |
| 6,599,580 B2 | 7/2003 | Muffoletto et al. | |
| 6,608,464 B1 | 8/2003 | Lew et al. | |
| 6,610,971 B1 | 8/2003 | Crabtree | |
| 6,619,123 B2 | 9/2003 | Gianchandani et al. | |
| 6,634,232 B1 | 10/2003 | Rettig et al. | |
| 6,645,656 B1 | 11/2003 | Chen et al. | |
| 6,723,140 B2 | 4/2004 | Chu et al. | |
| 6,741,178 B1 | 5/2004 | Tuttle | |
| 6,805,998 B2 | 10/2004 | Jenson et al. | |
| 6,818,356 B1 | 11/2004 | Bates | |
| 6,821,348 B2 | 11/2004 | Baude et al. | |
| 6,866,901 B2 | 3/2005 | Burrows et al. | |
| 6,897,164 B2 | 5/2005 | Baude et al. | |
| 6,906,436 B2 | 6/2005 | Jenson | |
| 6,924,164 B2 | 8/2005 | Jenson | |
| 6,961,285 B2 * | 11/2005 | Niemiec et al. | 368/10 |
| 6,982,132 B1 | 1/2006 | Goldner et al. | |
| 6,986,965 B2 | 1/2006 | Jenson | |
| 6,989,750 B2 * | 1/2006 | Shanks et al. | 340/572.4 |
| 7,028,547 B2 | 4/2006 | Shiratori et al. | |
| 7,102,522 B2 * | 9/2006 | Kuhns | 340/572.7 |
| 2001/0007335 A1 * | 7/2001 | Tuttle et al. | 235/492 |
| 2001/0014398 A1 | 8/2001 | Veerasamy | 428/408 |
| 2001/0033952 A1 * | 10/2001 | Jenson et al. | 429/7 |
| 2001/0043141 A1 * | 11/2001 | Tuttle | 340/10.4 |
| 2001/0043569 A1 * | 11/2001 | Wood, Jr. | 370/256 |
| 2001/0051300 A1 | 12/2001 | Moriguchi et al. | 429/231.8 |
| 2002/0000034 A1 | 1/2002 | Jenson | |
| 2002/0037756 A1 * | 3/2002 | Jacobs et al. | 455/572 |
| 2002/0076616 A1 | 6/2002 | Lee et al. | 429/300 |
| 2002/0110733 A1 | 8/2002 | Johnson | |
| 2002/0184949 A1 | 12/2002 | Gianchandani et al. | |
| 2003/0104590 A1 | 6/2003 | Santini, Jr. et al. | |
| 2003/0151118 A1 | 8/2003 | Baude et al. | |
| 2003/0169207 A1 * | 9/2003 | Beigel | 343/718 |
| 2003/0171984 A1 * | 9/2003 | Wodka et al. | 705/14 |
| 2004/0077383 A1 * | 4/2004 | Lappetelainen et al. | 455/574 |
| 2004/0094949 A1 * | 5/2004 | Savagian et al. | 283/81 |
| 2004/0131760 A1 | 7/2004 | Shakespeare | |
| 2004/0131761 A1 | 7/2004 | Shakespeare | |
| 2005/0019666 A1 | 1/2005 | Yasuda | |
| 2005/0079418 A1 | 4/2005 | Kelley et al. | |

FOREIGN PATENT DOCUMENTS

| | | |
|---|---|---|
| EP | 0078404 | 5/1983 |
| EP | 0410627 | 1/1991 |
| EP | 0643544 | 8/1994 |
| EP | 0860888 | 8/1998 |
| EP | 0867752 | 9/1998 |
| EP | 1 041 657 A2 | 10/2000 |
| GB | 2318127 | 4/1998 |
| JP | 58126679 | 7/1983 |
| JP | 57230095 | 7/1984 |
| JP | 60012679 | 1/1985 |
| JP | 60182961 | 2/1987 |
| JP | 62044960 | 2/1987 |
| JP | 63166151 | 1/1990 |
| JP | 03205757 | 9/1991 |
| JP | 03262697 | 11/1991 |
| JP | 06067018 | 3/1994 |
| JP | 6111828 | 4/1994 |
| JP | 6196178 | 7/1994 |
| JP | 06223805 | 8/1994 |
| JP | 07006933 | 1/1995 |
| JP | 07-050229 | 2/1995 |
| JP | 07057739 | 3/1995 |
| JP | 08017179 | 1/1996 |
| JP | 08293310 | 5/1996 |
| JP | 08-236105 | 9/1996 |
| JP | 08236105 | 9/1996 |
| JP | 08287901 | 11/1996 |
| JP | 08329983 | 12/1996 |
| JP | 09035233 | 2/1997 |
| JP | 09211204 | 8/1997 |
| JP | 10021896 | 1/1998 |
| JP | 10021933 | 1/1998 |
| JP | 2000188113 | 7/2000 |
| WO | WO-99/33124 | 7/1990 |
| WO | WO-92/15140 | 9/1992 |
| WO | WO-92/16025 | 9/1992 |
| WO | WO-92/19090 | 10/1992 |
| WO | WO-93/14612 | 7/1993 |
| WO | WO-95/14311 | 5/1995 |
| WO | WO-97/38453 | 10/1997 |
| WO | WO-97/39491 | 10/1997 |
| WO | WO-98/13743 | 4/1998 |
| WO | WO-98/47196 | 10/1998 |
| WO | WO-99/25908 | 5/1999 |

OTHER PUBLICATIONS

Dobley, Arthur, et al., "Non-aqueous Lithium-Air Batteries with an Advanced Cathode Structure", *Yardley Technical Products, Inc. / Lithion, Inc. Pawcatuck, CT 41st Power Sources Conference Proceedings, Philadelphia, PA,*(Dec. 10, 2003).

Aramoto, T., et al., "16.0% Efficient Thin-Film CdS/CdTe Solar Cells", *Jpn. J. Appl. Phys.*, vol. 36, Pt. 1, No. 10, (1997),pp. 6304-6305.

Birkmire, R. W., et al., "Polycrystalline Thin Film Solar Cells: Present Status and Future Potential", *Annu. Rev. Mater. Sci.*, 27, (1997),pp. 625-653.

Chu, T. L., et al., "13.4% efficient thin-film CdS/CdTe solar cells", *J. Appl. Phys.*, 70(12), (Dec. 15, 1991),pp. 7608-7612.

Dudney, N. J., et al., "Nanocrystalline LixMn2-yO4 Cathodes for Solid-State Thin-Film Rechargeable Lithium Batteries", *Journal of the Electrochemical Society*, 146(7), (1999),pp. 2455-2464.

Jacobson, A. J., "Intercalation Chemistry", *In: Encyclopedia of Inorganic Chemistry*, vol. 3, John Wiley & Sons,(1994),pp. 1556-1602.

Nomoto, S., et al., "Back-up Performance of Electric Double-Layer Capacitors for Rechargeable Batteries", *Electrochemical Society Proceedings*, vol. 96-25,(1997),268-279.

Shodai, T, et al., "Reaction Mechanisms of Li(2.6)Co(0.4) Anode Material", *Solid State Ionics*, 122,(1999),85-93.

Yoshida, T., "Photovoltaic Properties of Screen-Printed CdTe/CdS Solar Cells on Indium-Tin-Oxide Coated Glass Substrates", *J. Electrochem. Soc.*, 142 (9), (Sep. 1995),pp. 3232-3237.

Abraham, K M., et al., "A Polymer Electrolyte-Based Rechargeable Lithium/Oxygen Battery", *Journal of the Electrochemical Society*, vol. 143, (1996),1-5.

Dudney, Nancy J., "Addition of a thin-film inorganic solid electrolyte (Lipon) as a protective film in lithium batteries with a liquid electrolyte", *Journal of Power Sources*, vol. 89, (2000),176-179.

Read, J, "Characterization of the Lithium/Oxygen Organic Electrolyte Battery", *Journal of the Electrochemical Society*, 149, (2002),A1190-A1195.

Dunn, D., et al., "MoS2 Deposited by ion beam assisted deposition: 2H or random layer structure.", *Naval Research Laboratory*, (1998),pp. 3001-3007.

Goldner, R., "Ambient temperature synthesis of polycrystalline thin films of lithium cobalt oxide with controlled crystallites orientations", *Electrochemical Soc. Proceedings*, 98, (1999),pp. 268-273.

Goldner, R., et al., "Ambient Temperature Synthesis of Polycrystalline Thin Films of Lithium Cobalt Oxide with Controlled Crystallites' Orientation", *Mat. Res. Soc. Symp. Proc.*, 548, (1998),pp. 131-136.

Kyokane, J., et al., "Organic Solid Capacitor with Conducting Thin Films as Elecrolyte by Ion-Beam-Assisted Deposition", *Journal of Power Sources*, 60, (1996),pp. 151-155.

Liu, W., et al., "Deposition, Structural Characterization, and Broadband (1KHz-40GHz) Dielectri Behavior of BaxTi2-xOy Thin Films", *Mat. Res. Soc. Symp. Proc.*, 310, (1993),pp. 157-162.

Lugscheider, E., et al., "Comparison of the Structure of PVD-Thin Films Deposited With Different Deposition Energies", *Surface and Coatings Technology*, 86-87 (1-3), (Dec. 1, 1996),177-183.

Martin, P. J., et al., "Modification of the Optical and Structural Properties of Dielectric ZrO2 Films by Ion-assisted Deposition", *J. Appl. Phys.*, 55, (Jan. 1, 1984),235-241.

McKenzie, D. R., et al., "New Technology for PACVD", *Surface and Coatings Technology*, 82 (3), (1996),326-333.

Vereda, F., et al., "A Study of Electronic Shorting in IBDA-deposited Lipon Films", *Journal of Power Sources*, 89, (2000),pp. 201-205.

Zeitler, M., et al., "In Situ Stress Analysis of Boron Nitride Films Prepared by Ion Beam Assisted Deposition", *Nuclear Instruments and Methods in Physics Research B*, 139, (1998),pp. 327-331.

Dobley, Arthur, et al., "High Capacity Cathodes for Lithium-Air Batteries", Yardney Technical Products, Inc./Lithion, Inc. Pawcatuck, CT <http://www2.electrochem.org/cgi-bin/abs?mtg=206&abs=0496>.

Shukla, A. K., et al., "Electrochemical supercapacitors: Energy storage beyond batteries", *Current Science*, vol. 79, No. 12, (Dec. 25, 2000),1656-1661.

\* cited by examiner

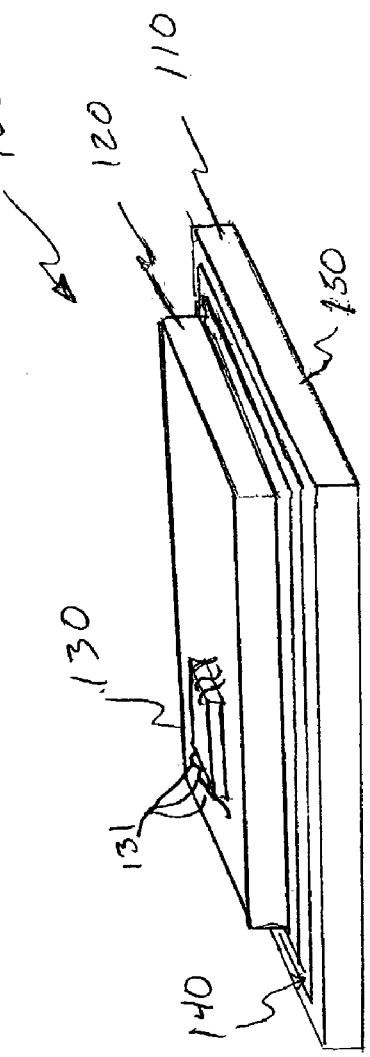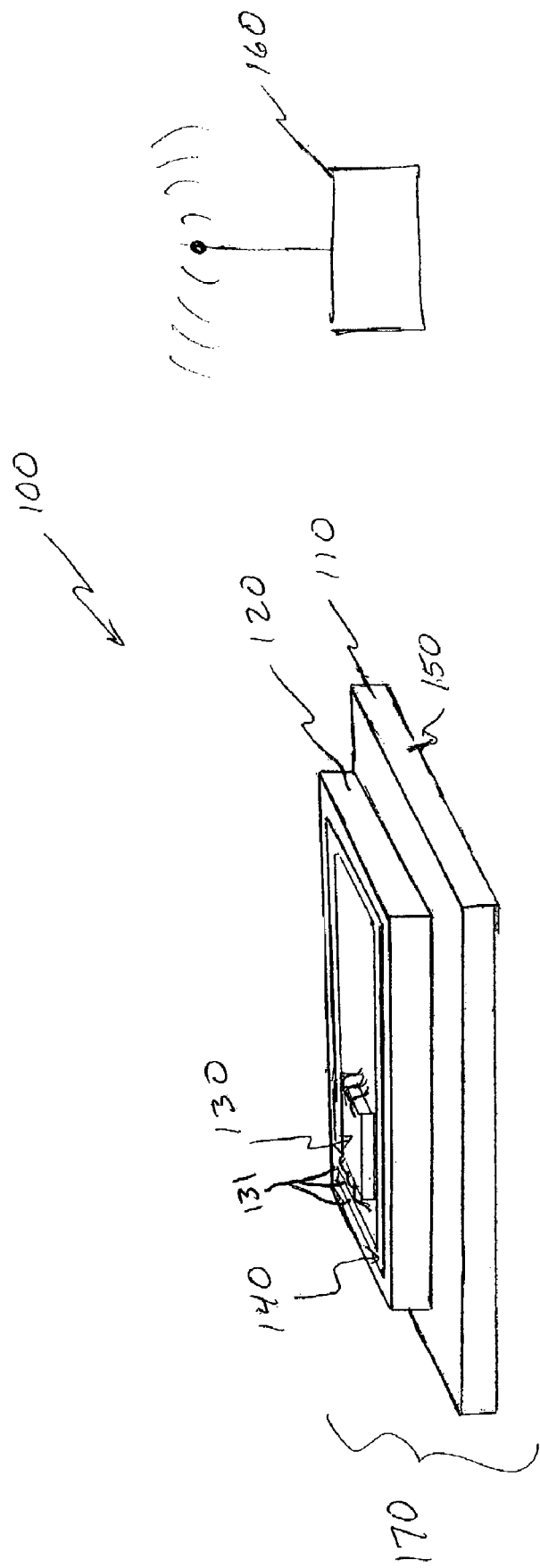
Fig 1A
Fig 1B

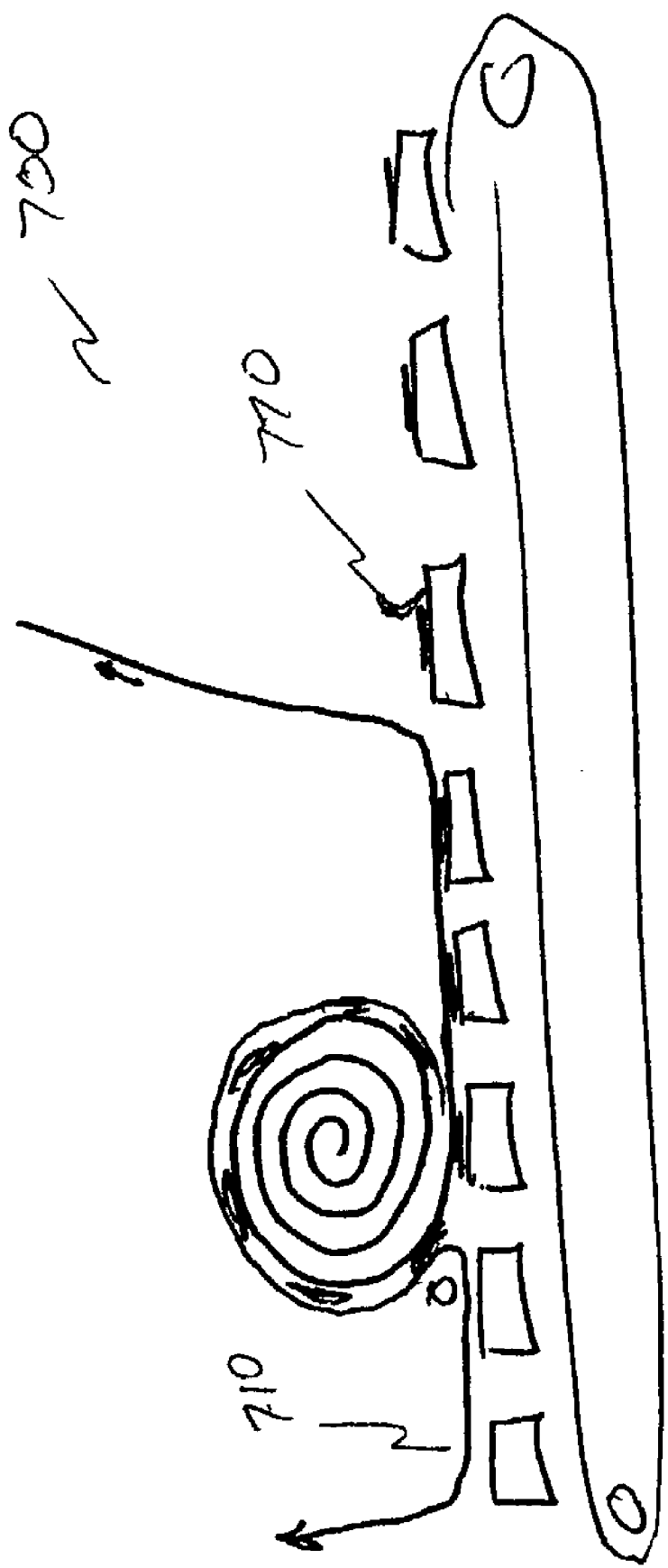

ACTIVE WIRELESS TAGGING SYSTEM ON PEEL AND STICK SUBSTRATE

CROSS-REFERENCES TO RELATED INVENTIONS

This invention is related to U.S. patent application Ser. No. 09/816,602 (now U.S. Pat. No. 6,986,965) titled "Device Enclosures with Integrated Batteries" filed Mar. 23, 2001, U.S. patent application Ser. No. 09/815,884 (now U.S. Pat. No. 7,433,655) titled "Battery-Operated Wireless-Communication Apparatus and Method," filed Mar. 23, 2001, U.S. patent application Ser. No. 10/336,620 (now U.S. Pat. No. 6,906,436) titled "Solid State Activity-Activated Battery Device and Method" filed on even date herewith, U.S. patent application Ser. No. 10/336,621 (now U.S. Pat. No. 7,294,209) titled "APPARATUS AND METHOD FOR DEPOSITING MATERIAL ONTO A SUBSTRATE USING A ROLL-TO-ROLL MASK" filed on even date herewith, and U.S. patent application Ser. No. 10/336,619 (now abandoned) titled "APPARATUS AND METHOD FOR DEPOSITING MATERIAL ONTO MULTIPLE INDEPENDENTLY MOVING SUBSTRATES IN A CHAMBER" filed on even date herewith, each of which is incorporated by reference.

FIELD OF THE INVENTION

The present invention relates to solid-state energy-storage devices and integration of these devices with an electronic circuit. More particularly, this invention relates to methods and systems for providing an active Radio Frequency (RF) tagging system for peel-and-stick applications. The present invention also relates to the making and using of thin-film solid-state energy-storage devices that include an adhesive.

BACKGROUND OF THE INVENTION

Electronics have been incorporated into many low-profile tags for property tracking, security, finance, access, etc. Conventional methods of tagging typically involve passive devices, i.e., devices that receive their power from an outside source, e.g., from received RF energy. This limits the functionality of the tag. One drawback to using batteries is that batteries must have sufficient capacity to power the device for at least the length of time the device is in use. Having sufficient battery capacity can result in a power supply that is quite heavy or large compared to the rest of the device. In other words, conventional batteries generally are rather large and cannot be incorporated into small packages, such as tags. There is a need for small batteries in devices that can be formed for use with tags attachable to small packages.

Most batteries today are fairly expensive. As a result, economics prevent widespread use of batteries in ultra-cheap disposable devices. In other words, currently, retailers would avoid providing a battery as part of a property-tag system. Typically, batteries may be provided as part of the product shipped but not as part of the packaging. Thus, there is a further need for a battery that can be made inexpensively and mass-produced.

SUMMARY OF THE INVENTION

The present invention provides a power source on the tag that lasts the life of the tagged item to allow sensing and communication capability, extending the scope of the tags possible functions. Portable devices, like tags, typically use batteries as power supplies.

The present invention also provides smaller and lighter batteries (i.e., power supplies) with sufficient energy storage to accomplish the functions desired in a property tag. The present invention further provides methods of use that can be automatically performed as a result of an RF transmission. The present invention also provides a battery that can be fabricated from non-toxic materials resulting in a non-hazardous disposable tag.

Another aspect of the present invention provides a radio-frequency identification (RFID) device on a thin-film battery. A system includes the RFID device in communication with a remote radio frequency (RF) transmitter and/or receiver. In one embodiment, the RFID device of the system includes a flexible substrate, a thin-film battery deposited on the flexible substrate, an electronic circuit placed on the battery and coupled to the battery to provide power, and a Radio Frequency (RF) antenna connected to the electronic circuit. In some embodiments the battery of the RFID device is a rechargeable battery, and the battery is recharged when energy is transmitted from the remote device. In other embodiments, the electronic circuit is formed as layers. In another embodiment, the electronic circuit is a mounted Integrated Circuit connected to the battery. In other embodiments, the RFID device includes an RF-activated switch. In an embodiment of the RFID device with an RF-activated switch, the RF-activated switch places the thin-film battery in communication with the electronic circuit. In another embodiment, the RF-activated switch awakens the electronic circuit from a low-power sleep mode.

Another aspect of the invention includes a method for providing a RFID device. The method includes providing a flexible peel-and-stick RFID device with a multi-bit identifier value, and a thin-film battery deposited on a flexible substrate, pressure-adhering the RFID device to an article, receiving RF energy at the RFID device, and based on the reception of the RF energy, coupling battery power to the RFID device to activate circuitry, where the activation initiates a task in the RFID device that includes transmitting an identifier (ID) value based on the multi-bit identifier of the RFID. In another embodiment, the task is storing a start time for an activity in the RFID device. In another embodiment, the task is running a self-check in the RFID device and storing the result of the self-check. In a further embodiment of the method, the RFID device receives an interrogation code from a remote RF transmitter device and performs an analysis of the interrogation code, where the ID value is transmitted to a remote RF receiver device based upon the analysis of the interrogation code. In another embodiment, receiving an interrogation code from the remote device causes the RFID device to store a timestamp for an event. In another embodiment, the RFID device stores a first timestamp to mark a shipping event and a second timestamp to mark a receiving event, and then compares the stored timestamps to determine the duration of shipping related events.

Another aspect of the invention provides a system for making an RFID device. The system includes one or more supply reels that feed one or more source substrates, one or more supply reels that feed one more electronic circuits and an RF antenna, one or more deposition stations that deposit layers onto the one or more substrates, a supply reel that feeds a peel-and-stick adhesive for attachment to the substrate, and a vacuum chamber that contains the supply reels and the deposition station. The layers deposited in the system include, layers to form a battery, and a wiring layer to couple the battery to the electronic circuitry layer and to couple the RF antenna to the electronic circuitry. The layers deposited to form a battery include (a) a cathode layer, (b) an electrolyte layer, and (c) an anode layer.

This summary is intended to provide an overview of the subject matter of the present patent application. It is not intended to provide an exclusive or exhaustive explanation of the invention. The detailed description is included to provide further information about the subject matter of the present patent application.

BRIEF DESCRIPTION OF THE DRAWINGS

FIG. 1A is a perspective view FIG. 1A of a wireless tagging system.

FIG. 1B is a perspective view of another embodiment of a Radio Frequency Identification (RFID) device.

FIG. 7 shows a diagram of one aspect of forming the RFID devices that includes a rolled release layer.

DETAILED DESCRIPTION

Figure 1C:
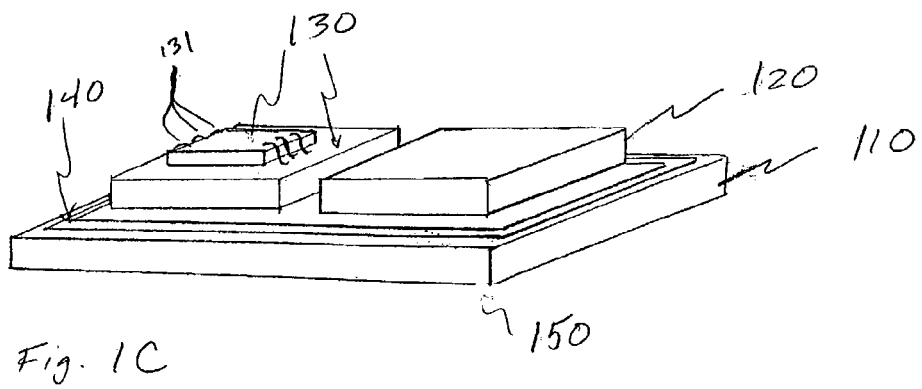
FIG. 1C is a perspective view of another embodiment of a RFID device.

In the following detailed description of the preferred embodiments, reference is made to the accompanying drawings that form a part hereof, and in which are shown, by way of illustration, specific embodiments in which the invention may be practiced. It is to be understood that other embodiments may be utilized and structural changes may be made without departing from the scope of the present invention.

It is to be understood that in different embodiments of the invention, each battery in the Figures or the description can be implemented using one or more cells, and if a plurality of cells is implemented, the cells can be wired in parallel or in series. Thus, where a battery or more than one cell is shown or described, other embodiments use a single cell, and where a single cell is shown or described, other embodiments use a battery or more than one cell. Further, the references to relative terms such as top, bottom, upper, lower, and other relative terms refer to an example orientation such as used in the Figures, and not necessarily an orientation used during fabrication or use.

The terms wafer and substrate as used herein include any structure having an exposed surface onto which a film or layer is deposited, for example, to form an integrated circuit (IC) structure or an energy-storage device. The term substrate is understood to include semiconductor wafers, plastic film, metal foil, molded plastic cases, and other structures on which an energy-storage device may be fabricated according to the teachings of the present disclosure. The term substrate is also used to refer to structures during processing that include other layers that have previously or subsequently been fabricated thereupon. In some embodiments, both wafer and substrate include doped and undoped semiconductors, epitaxial semiconductor layers supported by a base semiconductor or insulator, as well as other semiconductor structures well known to one skilled in the art. Substrate is also used herein as describing any starting material that is useable with the fabrication method as described herein.

The term "battery" used herein refers to one example of an energy-storage device. A battery may be formed of a single cell or a plurality of cells connected in series or in parallel. A cell is a galvanic unit that converts chemical energy, e.g., ionic energy, to electrical energy. The cell typically includes two electrodes of dissimilar material isolated from each other by an electrolyte through which ions can move.

The term "task" used herein refers broadly to software or firmware routines, state machines, and/or combinatorial logic that are adaptable to perform a particular function when exercised or executed.

The term "adatom" as used herein refers to a particle, molecule, or ion of material that has not yet been formed into a structure or film.

The term "Radio-Frequency (RF)" as used herein includes very low frequency electromagnetic signals coupled by, e.g., mutual inductance, as well as transmitted radio signals ranging from kHz to MHz to GHz.

FIG. 1A shows an embodiment of a wireless tagging system 100. The system includes a Radio Frequency Identification (RFID) device 170 and a remote RF device 160 for communicating with the RFID device. The RFID device 170 includes a battery 120 deposited on a flexible substrate 110, electronic circuit 130 placed on the battery 120 and operatively coupled to the battery 120 in order for the battery 120 to provide power to the electronic circuit 130, an RF antenna 140 deposited on the battery 120 and coupled to the electronic circuit 130, and an adhesive layer 150 deposited on the side of the flexible substrate that is opposite the battery 120 and electronic circuit 130 layer. In the embodiment shown, wiring 131 connects electronic circuit 130 to battery 120 and antenna 140. In another embodiment, a layer of wiring and contact is deposited between the battery 120 and the electronic circuit 130 to provide for coupling the electronic circuit 130 to the battery 120. In some embodiments, the electronic circuit is formed as layers on the RFID device. In other embodiments, the electronic circuit is preformed Integrated Circuits mounted on the deposited layers and connected to the battery by the wiring layer.

In another embodiment of the system 100 as shown in FIG. 1B, the RF antenna 140 is deposited on the flexible substrate 110.

In another embodiment of the system 100 as shown in FIG. 1C, the RF antenna 140 is deposited on the flexible substrate 10, an electronic circuit 130 is placed adjacent to the battery 120 on the flexible substrate 110, and the adhesive layer 150 is deposited on the side of the flexible substrate that is opposite the battery 120 and electronic circuit 130.

Figure 1D:
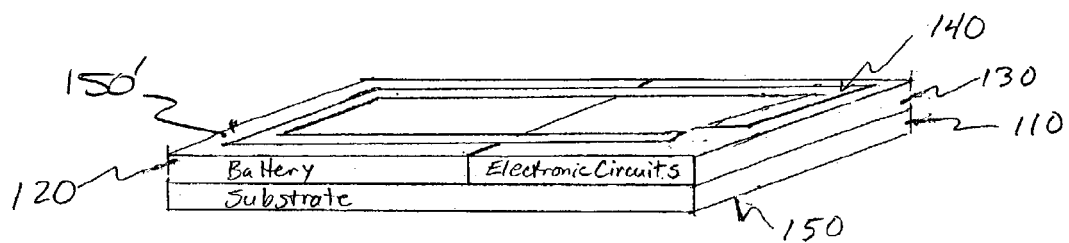
FIG. 1D is a perspective view of another embodiment of a RFID device.

In another embodiment of the system 100 as shown in FIG. 1D, electronic circuit 130 is placed adjacent to the battery 120 on the flexible substrate 110 to form a uniform surface to allow the adhesive layer 150' to be deposited on the uniform surface formed by the battery 120 and the electronic circuit 130 or allow the adhesive layer 150' to be deposited on the flexible substrate 110.

Figure 1E:
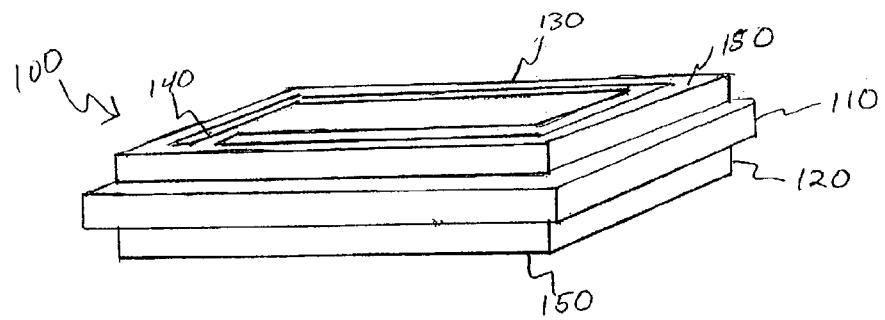
FIG. 1E is a perspective view of another embodiment of a RFID device.

In another embodiment of the system 100 as shown in FIG. 1E, the battery 120 is deposited on a first side of the flexible substrate 110 and the electronic circuit 130 and RF antenna 140 are placed on the opposite side of the flexible substrate 110 to allow the adhesive layer 150'' to be deposited on the electronic circuit 130 or allow the adhesive layer 150'' to be deposited the battery 120.

Figure 1F:
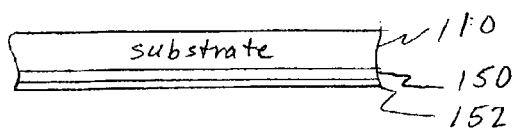
FIG. 1F is a cross-sectional view of one embodiment of an adhesive placed on a flexible substrate.

FIG. 1F shows one embodiment of an adhesive 150 placed on the flexible substrate 110. It should be noted that the adhesive 150 could be any type of adhesive including a releasable type of adhesive or a permanent adhesive. The adhesive layer 150, in some embodiments, is a peel-and-stick type of adhesive covered by a peel-able paper (also called a release paper) or plastic layer 152. In some embodiments, the adhesive layer 150 covers the entire substrate 110 surface while in other embodiments the adhesive layer 150 only covers a portion of the substrate surface 110. In some embodiments, the adhesive layer 150 covers all or a portion of the battery 120. In some embodiments, the adhesive layer 150 covers all or a portion of the electronic circuit. In some embodiments, the adhesive layer 150 covers all or a portion of a uniform surface formed by depositing the electronic circuit 130 adjacent to the battery 120.

Figure 2:
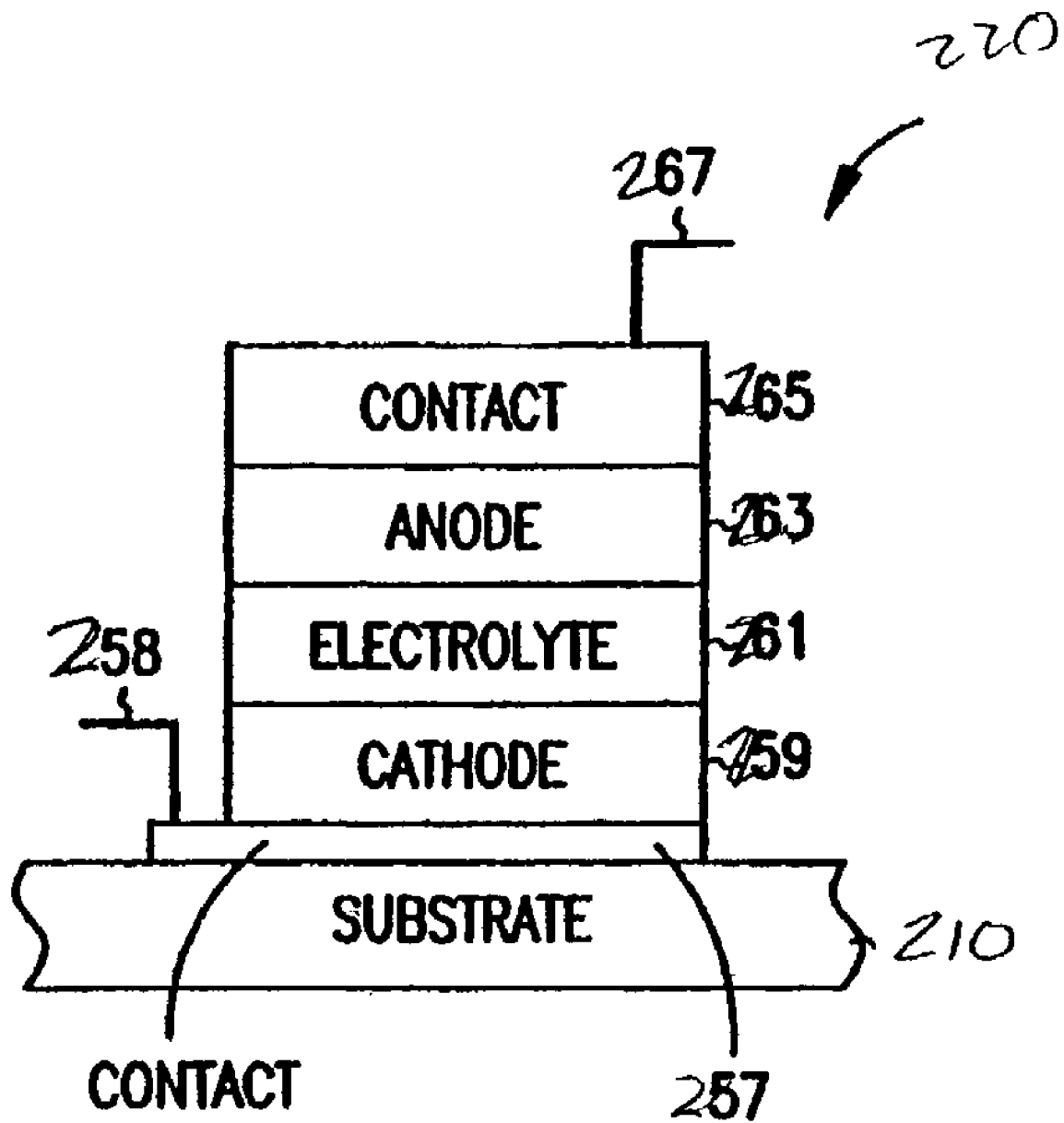
FIG. 2 is a cross-sectional view of one embodiment of a battery formed on a flexible substrate.

FIG. 2 shows an embodiment of a battery 220. A substrate 210 is provided on which is formed a contact film 257. Contact film 257 acts as a current collector and is connected to a lead 258, which, in some embodiments, connects one pole of the battery 220 to an external circuit. In some embodiments, the electronic circuit 130 (shown in FIGS. 1A-1E) is attached to the battery 220 as formed. In other embodiments, the electronic circuit 130 may be remote from the battery 220, for example, not attached to the battery 220 as formed. An electrode film 259 is formed on the contact film 257. In some embodiments, the electrode film 259 substantially covers a surface of the contact film 257 so as to minimize resistance by maximizing the area of the interface between the films. In some embodiments, the electrode film 259 is a cathode for a thin-film battery 220. An electrolyte film 261 is formed on the electrode film 259. An electrode film 263 is formed on the electrolyte film 261. The electrolyte film 261 isolates electrode film 259 from electrode film 263. A contact film 265 is formed on electrode film 263. Contact film 265 acts as a current collector and is connected to a lead 267, which connects one pole of the battery 220 to an external circuit. In some embodiments, the contact film 265 substantially covers a surface of the electrode film 263 so as to minimize resistance by maximizing the area of the interface between these films. In some embodiments, the electrode film 263 is an anode for a thin-film battery.

In one embodiment, the electrolyte film 261 includes LiPON. As used herein, LiPON refers generally to lithium phosphorus oxynitride materials. One example is $Li_3PO_4N$. Other examples incorporate higher ratios of nitrogen in order to increase lithium ion mobility across the electrolyte.

A method for fabricating the solid-state battery 220 is discussed in U.S. patent application Ser. No. 10/336,620 entitled "Solid State Activity-Activated Battery Device and Method" and is incorporated herein by reference.

In some embodiments, the solid-state battery 220 is formed in five or six stages. A first stage begins with a pre-cleaning of the substrate using a Mk II Ion Gun system in an atmosphere of argon flowing through the ion gun at a rate of 5 sccm for four minutes at 70V and 2 A. A 2500 Å cathode metal layer of nickel is then formed on the substrate 210 by depositing nickel with an electron beam gun using 200 mA and 6500V. A second stage begins with a sputter etch of the nickel cathode collector for one minute at a power of 250 W in argon at 12 mT pressure followed by a target burn-in period of five minutes at a power of 1200 W in an atmosphere of 80% oxygen and 20% argon ambient at 15 mT. A cathode layer 259 is then formed on the cathode metal layer by a deposition of $LiCoO_2$ at a power of 1200 W for sixty minutes in an atmosphere of 80% oxygen and 20% argon at a pressure of 15 mT. A third stage begins with a target burn-in period of five minutes at a power of 750 W in nitrogen at a pressure of 5 mT. An electrolyte layer 261 is then formed by a deposition of $Li_3PO_4$ at a power of 750 W for fifty-seven minutes in an atmosphere of 40 sccm of nitrogen at 5 mT. In other embodiments, an anode deposition stage is then performed to deposit an anode. A fourth stage begins with a pre-cleaning of the previously formed layers using a Mk II Ion Gun system in an atmosphere of argon flowing through the ion gun at a rate of 5 sccm for four minutes at 70V and 2 A. A 2500 Å anode metal layer of copper is then formed on the electrolyte layer by depositing copper with an electron beam using 150 mA and 7600V. A fifth stage begins with a pre-cleaning of the previously formed layers using a Mk II Ion Gun system in an atmosphere of argon flowing through the ion gun at a rate of 5 sccm for four minutes at 70V and 2 A. A 5000 Å passivation layer of SiN is then formed with an electron beam gun using 150 mA and 7600V while coincidentally bombarding the growing film with an Mk II Ion Gun system at 90V and 2 A and a gas flow of 18 sccm of nitrogen flowing through the gun.

Figure 3A:
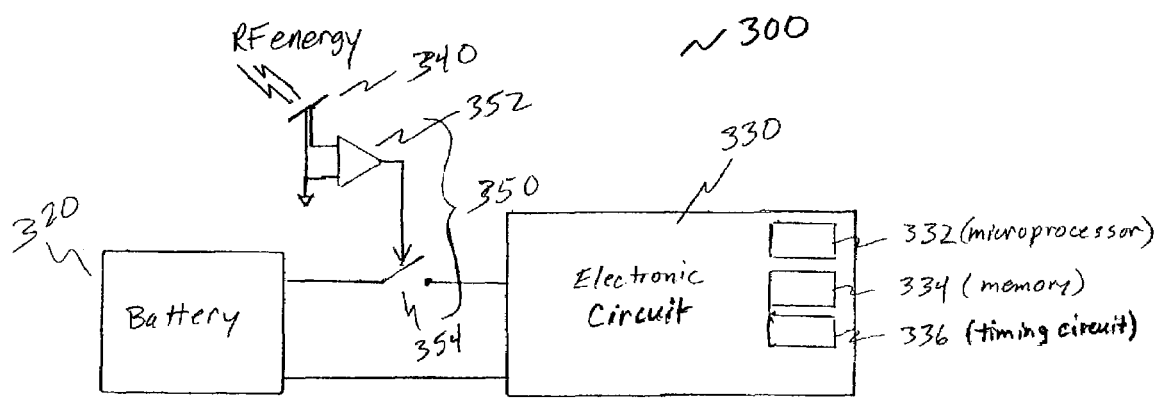
FIG. 3A shows a schematic diagram of an RFID device.
Figure 3B:
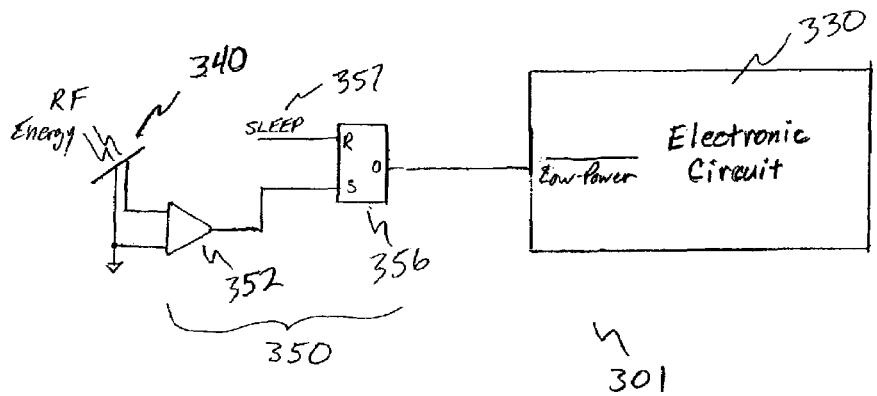
FIG. 3B shows a schematic diagram of another embodiment of an RFID device.

FIG. 3A shows a schematic diagram of an RFID device 300 that includes a battery 320, electronic circuit 330, RF antenna 340, and RF-activated switch 350. The battery is typically a thin-film battery formed on a substrate 110 as shown in FIGS. 1A-1F, and FIG. 2. The circuit may be incorporated and attached to the battery 320 on the substrate 110. In the alternative, the electronic circuit 330 may be formed or placed upon a substrate 110 and the battery 320 formed atop the electronic circuit 330. An RF-activated switch 350 is also formed on the substrate along with the battery 320 and the electronic circuit 330. RF energy received by RF antenna 340 is detected and amplifier circuit 352 captures the occurrence of the event. Switch 354 is then closed, operatively coupling battery power to the electronic circuit 330. Electronic circuit 330 includes additional devices such as solid-state memory 334, a timing circuit 336, and a microprocessor 332. The memory 334 as shown is typically a non-volatile memory. Non-volatile memory stores information whether the electronic circuit 330 is powered or unpowered. In other words, using non-volatile memory 334 and the timing circuit 336, it is possible to record the times of certain events within the memory 334 during the time frame in which the battery 320 is capable of powering the electronic circuit 330. For example, in some instances, the time at which the RF-activated circuit 350 was closed or placed into an active state could be recorded within the memory 334. The timing circuit 336 which would include a timer could be used to record the date and time or merely the time that an RF-related occurrence activated the switch 350. Once the electronic circuit 330 is activated, the microprocessor 332 could carry out specific functions. In some instances, the microprocessor 332 could have very specific and limited tasks and may be termed a microcontroller since it would have dedicated and specific tasks to perform FIG. 3B shows a schematic diagram of another embodiment of an RFID device 301. RF energy is received by RF antenna 340 and is detected by amplifier circuit 352. This sets Flip-Flop 356, activating the electronic circuit 330 from a low-power mode to an activated mode. To re-enter the low-power mode, LOW-POWER signal 357 resets Flip-Flop 356. Once activated, the device operates as discussed above for FIG. 3A.

It should be noted that the solid-state battery 320 shown in FIGS. 3A and 3B could merely be a one-time use battery or could be formed to be recharged over time. The battery 320 could be recharged using a photovoltaic cell (optionally formed or deposited on the surface of a substrate) and exposing the platform to light, or could be recharged using periodic bursts of radio frequencies, or by any other similar means. The use of rechargeable batteries is discussed in U.S. patent application Ser. No. 09/815,884 entitled "Battery-Operated Wireless-Communication Apparatus and Method" filed Mar. 23, 2001, and in U.S. patent application Ser. No. 10/336,620 entitled "Solid State Activity-Activated Battery Device and Method" filed Jan. 2, 2003, which are co-owned by the applicant of this application and are incorporated herein by reference.

Certain needs exist within industry that would benefit from the integration of energy, storage and electronics on a single platform.

The present invention provides a device that integrates electronics (including RF electronics) and solid-state batteries in a single device. In many instances, the system or platform has a very small form factor. FIGS. 1A to 4B show exemplary sample schematics of such systems or platforms. Discussions of specific examples follow.

Figure 4A:
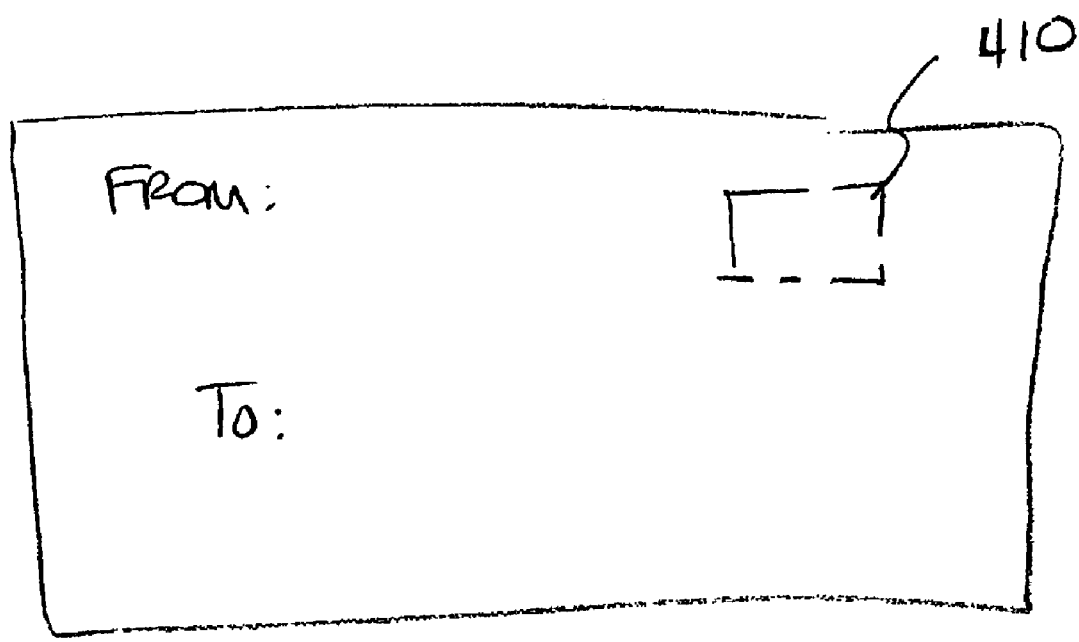
FIG. 4A shows an embodiment of a shipping label that uses an RFID device.
Figure 4B:
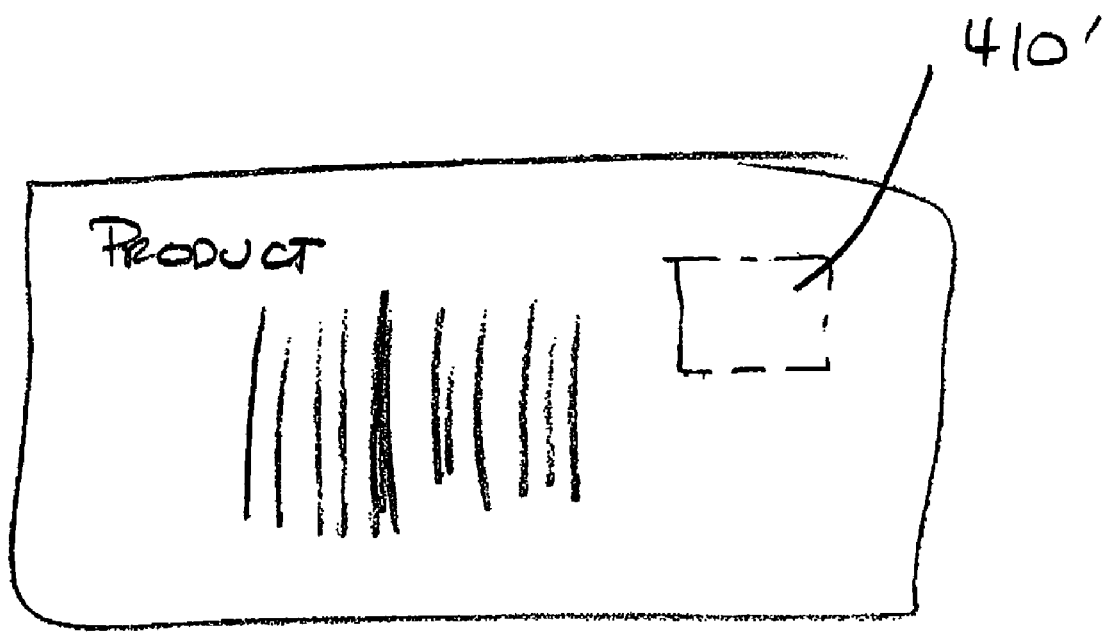
FIG. 4B shows an embodiment of a product label that uses an RFID device.

One example or use of this particular RFID device is marking the time of the beginning of a warranty period. For example, if the RFID device is attached to a product, RF energy could activate the device at the time a product is purchased, and a clock could be started to mark the beginning of the warranty or time frame. Alternatively, the RF energy would transmit a time stamp that is permanently stored in the device. This allows for very close proximity or a very close approximation of when the warranty period was started. At a later time when a consumer wished to return a product covered under a warranty, a requirement of the warranty could be that the package or label is returned along with the product. The time of the warranty could then be checked. This would prevent consumers from ordering another product and returning it as a new product underneath a warranty period. In some embodiments, the system, which includes an RF-activated switch, could be included in a peel off label or a shipping label that could be either attached directly to the product or directly to a package for the product. FIGS. 4A and 4B show two embodiments of using labels that use a system including RF-activated switch 350. A system that includes a thin-film solid-state battery 320, an RF-activated switch 350 and electronic circuit 330 is, in some embodiments, formed as part of a label such as the shipping or mailing label shown in FIG. 4A or the product label shown in FIG. 4B. Each of the labels includes a platform or system 410, 410' that includes a thin-film solid-state battery 320, an electronic circuit 330, and an RF-activated switch 350.

Another example would be to use the RFID device in a mailing or shipping label 410 for detecting and logging the time of shipping and delivery related events. An RF transmitting device would activate the RF-activated switch 350 and start timing circuit 336 to detect and log the beginning of the shipping duration. Another example or use of this particular RFID device includes use as a backup to, or supplement to, the information on the printed label. If the printed information becomes no longer readable, or unavailable due to loss, the RFID device could transmit stored information to an RF receiving device when prompted.

Another example is to use the RFID device in a product label 410' to tag and track property. Remote RF transmitting and receiving devices could be placed at various stations in a warehouse or shipping and receiving area. The remote RF devices then detect and log when a package passes the station. In another example, the RFID device is also used to locate property with a portable RF transmitting and receiving device. The remote RF device, in some embodiments, transmits an interrogation code for a particular RFID device. The RF energy from the interrogation would activate the RFID device, and the RFID device then analyzes the interrogation code and responds by transmitting the RFID identification code, thereby indicating the presence of the particular RFID device to the remote RF device.

Another example is to use the RFID device in a drug treatment system that uses drug patches adhered to the skin to deliver drugs by a method such as iontophoresis. Use of a thin-film solid-state battery allows electronic circuits to be used in the iontophoretic device while maintaining a low device-profile so as to not interfere with a patient's clothing. In this example, the RFID device is attached to a drug patch that contains a drug reservoir. The electronic circuit 330 activates the device to begin a delivery of a bolus of drug. Microprocessor 332 stores information in memory 334 such as when the device was activated, when a bolus of drug was delivered, and how many boluses were delivered. Timing circuit 336 is optionally used to prevent the patient or caregiver from administering doses too often. A caregiver optionally uses the remote RF device to transmit RF energy to initiate a delivery of a bolus of drug, or to interrogate the RFID device to determine the history of drug therapy provided by the device. In some embodiments, the RFID device is activated when the RF device activates an RF-actuated switch. In other embodiments, the RFID device is switch-activated when the RFID portion of the device is attached to the drug reservoir portion of the device.

Figure 5A:
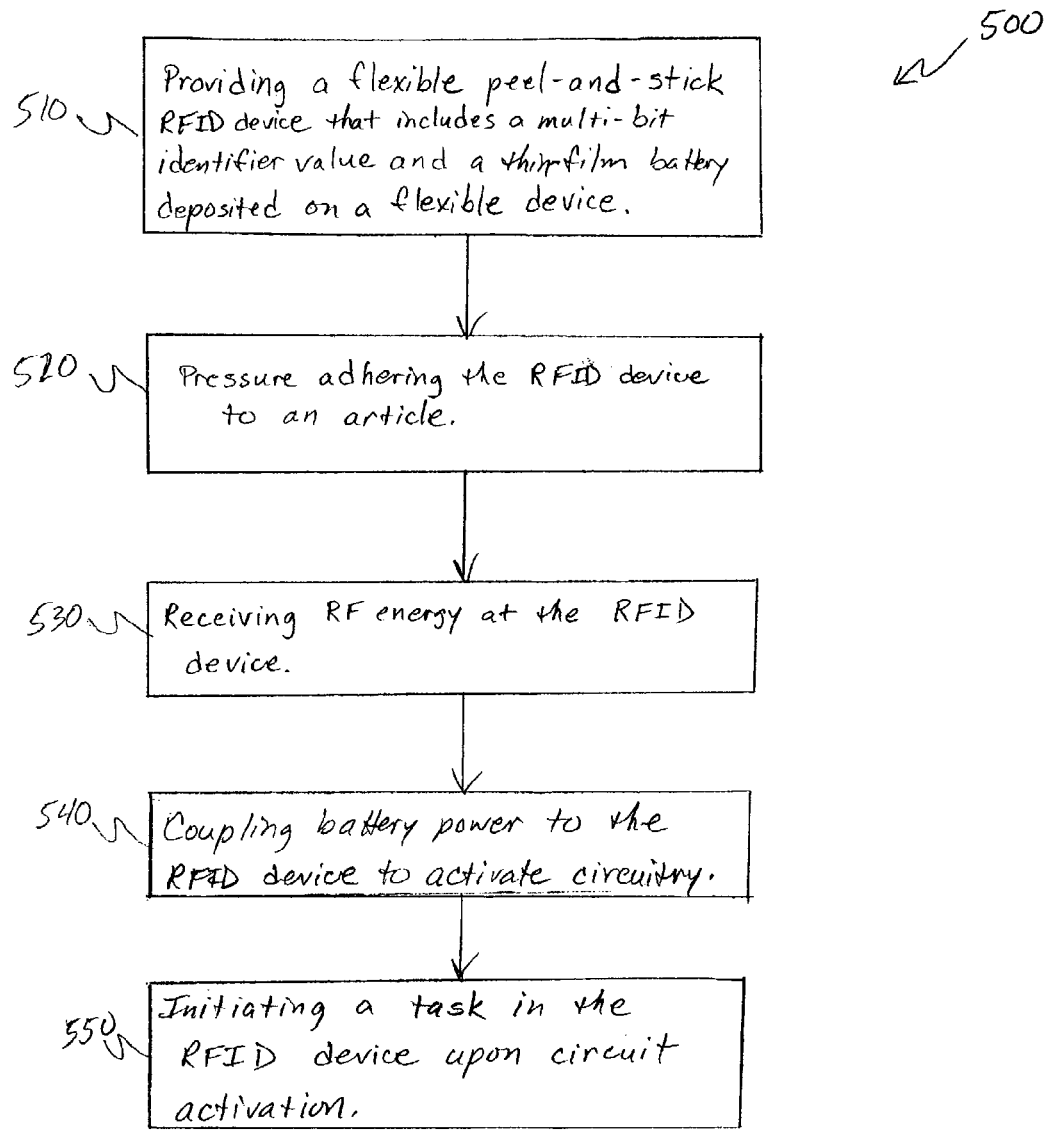
FIG. 5A shows a flowchart of a method of using an RFID device.

FIG. 5A shows one embodiment of a method 500 of using an RFID device. The method 500 includes providing 510 a flexible peel-and-stick RFID device 100 that includes a multi-bit identifier value and a thin-film battery deposited on a flexible substrate, pressure-adhering 520 the RFID device 100 to an article, receiving 530 RF energy at the RFID device, and based on the reception of the RF energy, coupling 540 battery power to the RFID device 170 to activate circuitry, where the activation initiates 550 a task in the RFID device 170 that includes transmitting an identifier (ID) value based on the multi-bit identifier of the RFID device 170 (shown in FIG. 1A).

Figure 5B:
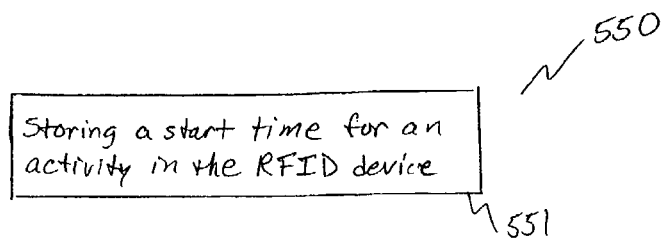
FIG. 5B shows a flowchart of another embodiment of a method of using an RFID device.
Figure 5C:
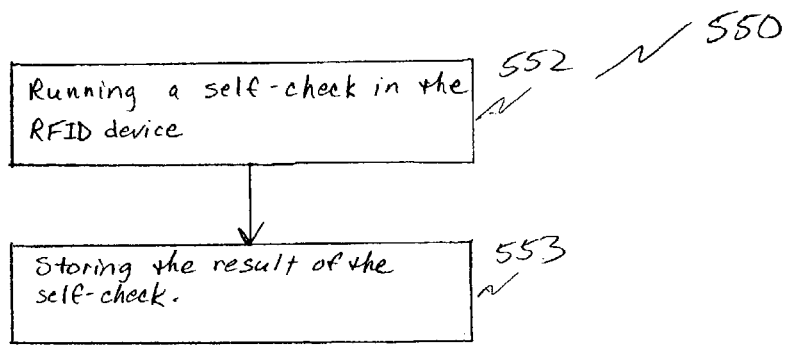
FIG. 5C shows a flowchart of another embodiment of a method of using an RFID device.
Figure 5D:
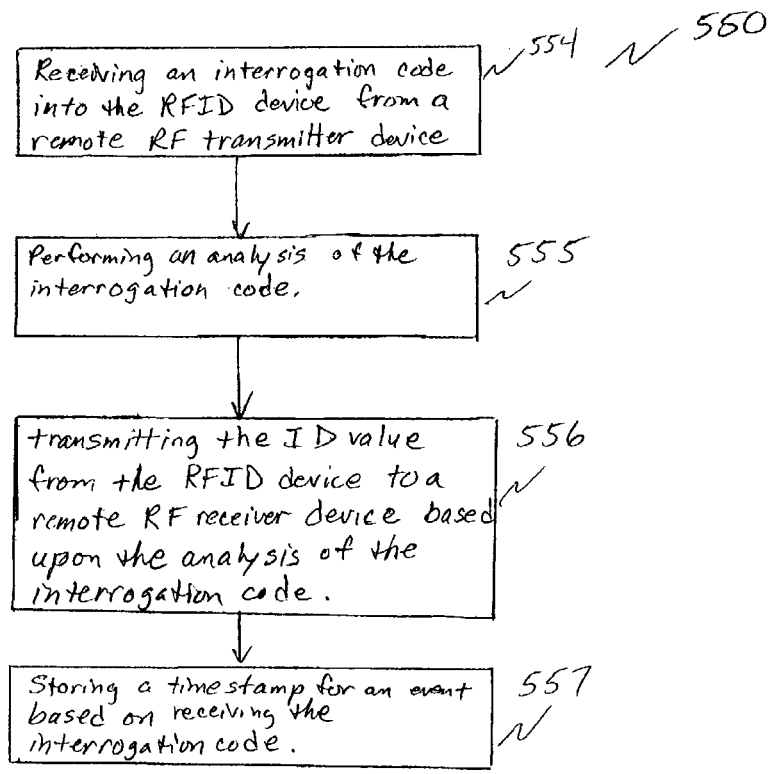
FIG. 5D shows a flowchart of another embodiment of a method of using an RFID device.
Figure 5E:
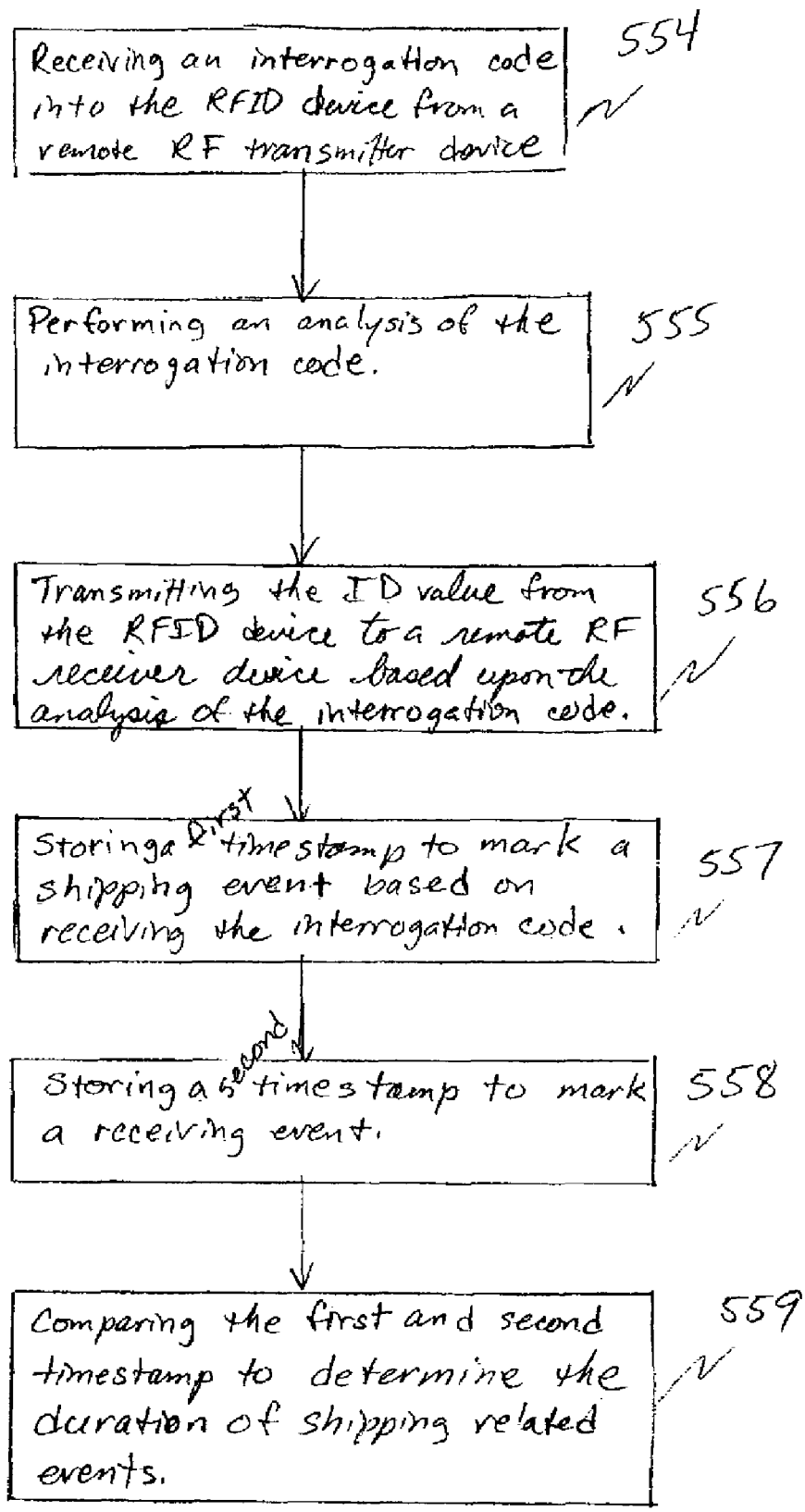
FIG. 5E shows a flowchart of another embodiment of a method of using an RFID device.

In another embodiment, such as shown in FIG. 5B, the task is storing 551 a start time for an activity in the RFID device 170. In another embodiment such as shown in FIG. 5C, the task is running 552 a self-check in the RFID device 170 and storing 553 the result of the self-check. In a further embodiment of the method such as shown in FIG. 5D, the RFID device 170 receives 554 an interrogation code from a remote RF transmitter device 160 and performs 555 an analysis of the interrogation code, and transmits 556 the ID value to a remote RF receiver device 160 based upon the analysis of the interrogation code. In another embodiment, receiving an interrogation code from the remote device causes the RFID device 170 to store 557 a timestamp for an event. In another embodiment such as shown in FIG. 5E, the RFID device 170 stores 557 a first timestamp to mark a shipping event and stores 558 a second timestamp to mark a receiving event, and then compares 559 the stored timestamps to determine the duration of shipping related events.

Figures 6A, 6B:
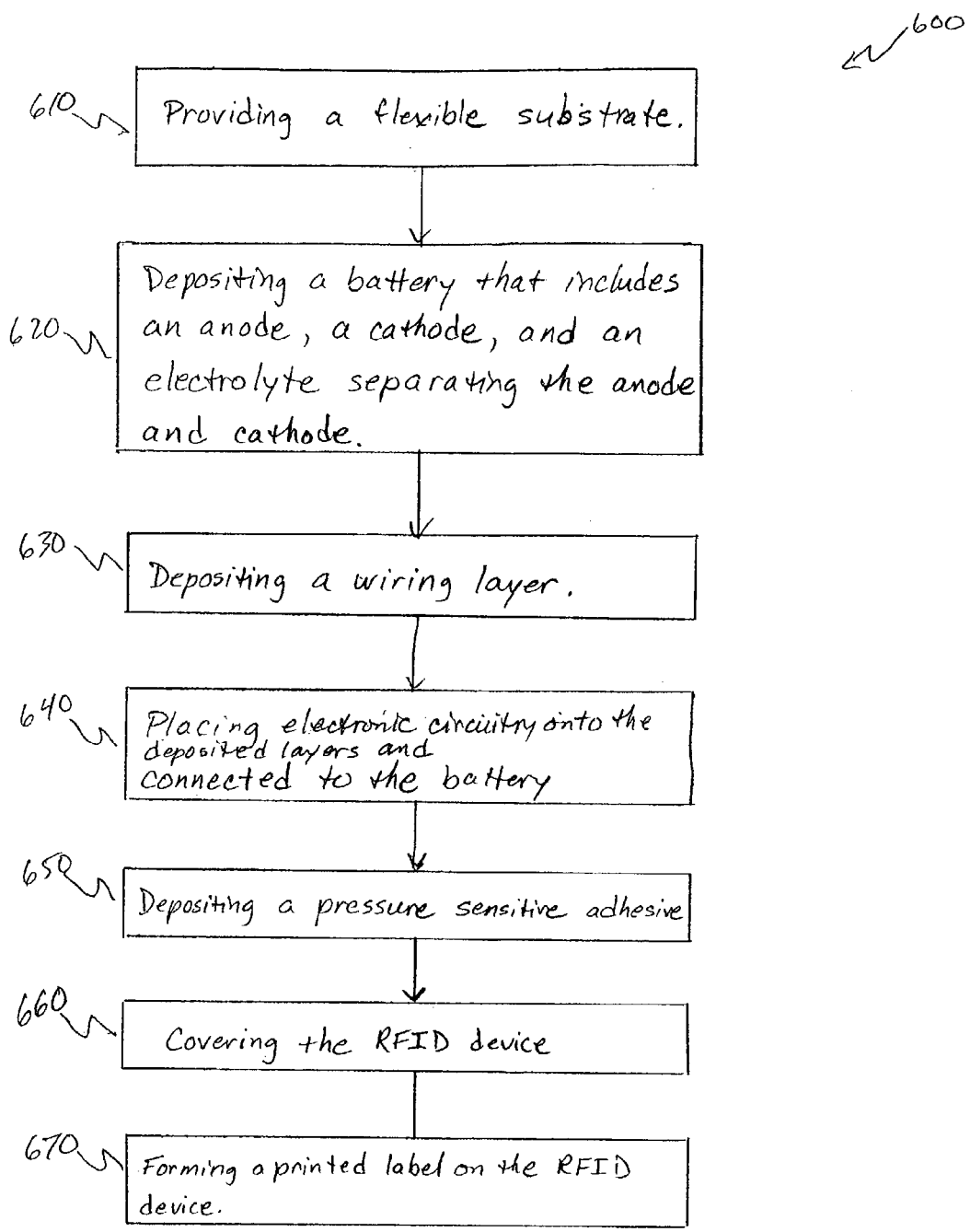
FIG. 6A shows a flowchart of a method of forming an RFID device.
FIG. 6B shows a flowchart of a further embodiment of a method of forming an RFID device.

Another method, shown in FIG. 6A, includes forming an RFID device 170. One embodiment of the method 600 includes providing 610 a flexible substrate, depositing 620 a battery that includes an anode, a cathode, and an electrolyte separating the anode and cathode, depositing 630 a wiring layer, placing 640 electronic circuit on the battery that is connected to the battery, depositing 650 a pressure sensitive adhesive to allow peel-and-stick applications, and covering 660 the RFID device. Some embodiments include performing these processes in the order shown in FIG. 6, while other embodiments combine one or more processes as a single operation, or perform the processes in a different order, resulting in a different order of layers. One embodiment includes arranging the elements of the RFID device as (i) the cover, (ii) the electronic circuit, (iii) the wiring layer, (iv) the battery, (v) the substrate, and (vi) the pressure sensitive adhesive. In another embodiment, the method 600 includes forming 670 a printed label onto the RFID device.

In another embodiment as shown in FIG. 6B, the battery is deposited 620 on the substrate using an ion assist energy between about 50 eV to about 95 eV.

In other embodiments, the battery is deposited on the substrate using ion assist energy between 70 eV to 90 eV. In other embodiments, the battery is deposited on the substrate using ion assist energy between 65 eV to 70 eV. In other embodiments, the battery is deposited on the substrate using ion assist energy between 70 eV to 75 eV. In other embodiments, the battery is deposited on the substrate using ion assist energy between 75 eV to 80 eV. In other embodiments, the battery is deposited on the substrate using ion assist energy between 80 eV to 85 eV. In other embodiments, the battery is deposited on the substrate using ion assist energy between 85 eV to 90 eV. In other embodiments, the battery is deposited on the substrate using ion assist energy between 90 eV to 95 eV. In other embodiments, the battery is deposited on the substrate using ion assist energy between 65 eV to 95 eV. In other embodiments, the battery is deposited on the substrate using ion assist energy between 65 eV to 85 eV. In other embodiments, the battery is deposited on the substrate using ion assist energy between 65 eV to 75 eV. In other embodiments, one or both of the endpoints of the above ranges is approximate. In other embodiments, the battery is deposited on the substrate using ion assist energy of about 65 eV. In other embodiments, the battery is deposited on the substrate using ion assist energy of about 70 eV.

In some embodiments, the battery deposited on the flexible substrate is a rechargeable battery.

Another aspect of the invention provides a flexible peel-and-stick battery-operated device. An embodiment of the device 170 is shown in FIG. 1 and includes a flexible substrate 110, a thin-film battery 120 deposited on the flexible substrate 110, an electronic circuit 130 deposited on the battery 120 and coupled to the battery 120 to provide power to the electronic circuit 130, a Radio-Frequency (RF) antenna 140 coupled to the electronic circuit 130, and an adhesive 150 applied to the flexible substrate 110. In other embodiments, the order of the layers is different from that shown in FIG. 6; for example, the electronic circuit is, in some embodiments, placed on the substrate beside or beneath the battery layers.

In another embodiment of the device, the electronic circuit 130 includes an RF-enabled switch that electrically activates the electronic circuit 130. In another embodiment the RF-enabled switch includes a MEMs device. In another embodiment, the RF antenna 140 of the device is integrated into the substrate 110. In another embodiment, the battery 120 of the device is a rechargeable battery. One aspect of forming the RFID devices as shown in FIG. 7 includes a rolled release layer 710 having releasably affixed thereon a plurality of the RFID devices 770.

Figure 8A:
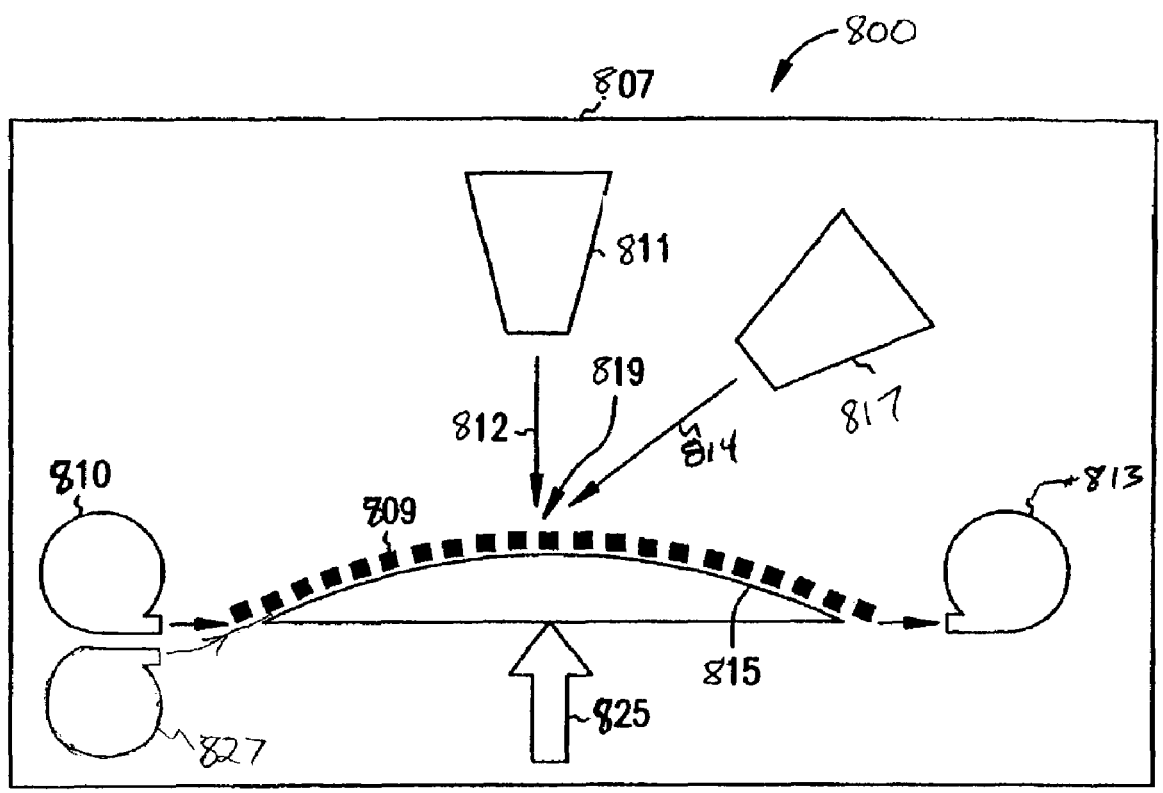
FIG. 8A shows a cross sectional view of a system for making an RFID device.

Another aspect of the invention provides a system for making an RFID device as shown in FIG. 8A. The system 800 includes one or more supply reels 810 that feed one or more source substrates 809, one or more supply reels 810 that feed one or more electronic circuits and an RF antenna, one or more deposition stations 811 that deposit layers onto the one or more substrates, a supply reel 827 that feeds a peel-and-stick adhesive for attachment to the substrate, and a vacuum chamber 807 that contains the supply reels 810, the deposition station 811, and assist source 817. The layers deposited in the system include layers to form a battery, and a wiring layer to couple the battery to the electronic circuit and to couple the RF antenna to the electronic circuit. The layers deposited to form a battery include (a) a cathode layer, (b) an electrolyte layer, and (c) an anode layer. The substrates are fed over an arched thermal surface 815 and taken up by an end roll 813. The first material deposition station 811 produces a beam of adatoms 812 to be deposited on substrates 809. Beam 812 is focused on a location 819 on substrates 809 to form a layer of a battery. An assist source 817 produces a beam of energized particles 814 directed at the substrate 809. The energized particle beam 814 provides the energy required to control growth and stoichiometry of the deposited material of the first beam 812. Thus, a crystalline structure is formed on the substrate 809 as is explained in greater detail below. The substrate 809, in various embodiments, includes an elastomer, polymer, paper and/or plastic web or sheet on which the energy-storage device is fabricated. Substrate 809, being elongate, allows a plurality of energy-storage devices to be deposited on successive locations of the substrate, thereby improving the rate of energy device production. In some embodiments, a plurality of deposition stations 811 are provided to simultaneously deposit a plurality of films at different locations on the substrate 809.

In some embodiments, the deposition of the electrolyte film includes directing an electrolyte material to a location at least partially in contact with the cathode film, while simultaneously supplying energy to the electrolyte material. In one embodiment, the energy is supplied by energized particles. In some such embodiments, the energized particles are energized ions. In some such embodiments, the energized particles from the assist source are of a different material than the electrolyte material, such as, for example, an inert gas. In other embodiments, the energized ions react with other components of the deposition to become part of the deposited layer. The energized particles supply energy to the electrolyte first material to assist in the growth of a desirable, solid electrolyte-film structure. Moreover, this controls the stoichiometry of the growing electrolyte film.

In some embodiments, the first material deposition station 811, or first source, provides $Li_3PO_4$ in a nitrogen atmosphere. In other embodiments, the first source 811 provides $Li_3PO_4$ in a vacuum environment wherein the background pressure is less than about 0.001 Torr. The assist source 817, or second source, provides energized particles from a source gas. In some embodiments, the secondary source 817 is an ion source supplying energetic ions from a source gas including oxygen (e.g., $O_2$) and/or nitrogen (e.g., $N_2$). The source gas, in other embodiments, comprises a noble gas, e.g., argon, xenon, helium, neon, and/or krypton. The energized particles and/or ions increase the energy of the material forming the electrolyte film 261 of the battery in FIG. 2, thus enhancing layer-by-layer growth. Accordingly, the electrolyte film is of a higher quality than conventional electrolyte layers.

An embodiment for forming a LiPON electrolyte film 261 includes the first source providing $Li_3PO_4$ at or to the location where the LiPON electrolyte film is to be formed and second source providing energized nitrogen particles to or near the same location. The energized nitrogen particles react with $Li_3PO_4$ provided at the location for forming the electrolyte film. This increases the amount of nitrogen in the LiPON electrolyte film. Increasing the nitrogen content is desirable, in some embodiments, to increase lithium ion mobility across the electrolyte.

In a further embodiment, the chamber in which the substrate 809 is positioned has a nitrogen-enhanced atmosphere. A LiPON electrolyte film is formed by the $Li_3PO_4$ supplied by the first source reacting with the nitrogen in the chamber. The second source provides energized particles assisting in the formation of the electrolyte film. In another embodiment, the second source also provides nitrogen to the $Li_3PO_4$ at the location. Thus, the $Li_3PO_4$ reacts with both the nitrogen in the chamber and with energized, nitrogen-containing particles supplied by the second source. This increases the nitrogen content of the electrolyte film 261. In some embodiments, increasing the nitrogen content in the electrolyte film 261 is desirable since published data from the Department of Energy lab at Oak Ridge, Tenn. indicates an increase in nitrogen content increases the ion conductivity or mobility in the electrolyte film.

The crystalline structure of a thin film formed according to the teachings herein has a higher order than those achieved by conventional cathode film forming techniques. Conventional techniques rely on a high-temperature, post-cathode-deposition anneal to reorder and crystallize the structure of a conventional cathode film. Unfortunately, such conventional techniques anneal the entire structure to the same temperatures, which is undesirable in that the substrate must withstand such temperatures that eliminate many otherwise suitable substrate materials from consideration. Further, different layers cannot be provided with different anneals suited to their different requirements. A highly ordered crystalline cathode film is desirably achieved according to the teachings described herein by providing the required energy to form the desired, high-order and appropriately oriented crystal structure without subjecting the substrate, and other layers formed on the substrate including the cathode-contact film to a high-temperature anneal. Further, each layer can be annealed using a different anneal process (such as using ion-assist beams having different energies for different layers, or depositing and annealing at different rates or for different durations). Further, by annealing the surface layer of the previous layer, a subsequent layer can be deposited onto a surface that has been ordered in a specific way (for example, to achieve a specific crystal orientation, or a specific ion-bonding surface) that enhances the quality of that subsequent layer.

As will be understood by reading the present invention, the systems shown herein for depositing films are adaptable to form the electrolyte film 261 according to the present invention. Examples of some such systems are shown in FIGS. 8A-9B.

In the system of FIG. 8A, the thermal control surface 815 is connected to a thermal source 825, which controls the temperature of surface 815. The substrate 809 is in thermodynamic contact with surface 815 for controlling the temperature of the substrate as needed for a particular deposition process on a particular substrate. In one embodiment, the thermal source is a coolant source, for example a cryogenic vacuum pump that releases compressed helium toward the surface 815 to cool it. The use of a thermally controlled surface 815 in direct contact with the substrate 809, especially when the direct contact is aligned or coincident with the location where a thin film is being formed, allows the use of substrates that have lower thermal degradation temperatures than are possible using conventional solid-state thin-film battery fabrication processes.

Figure 8B:
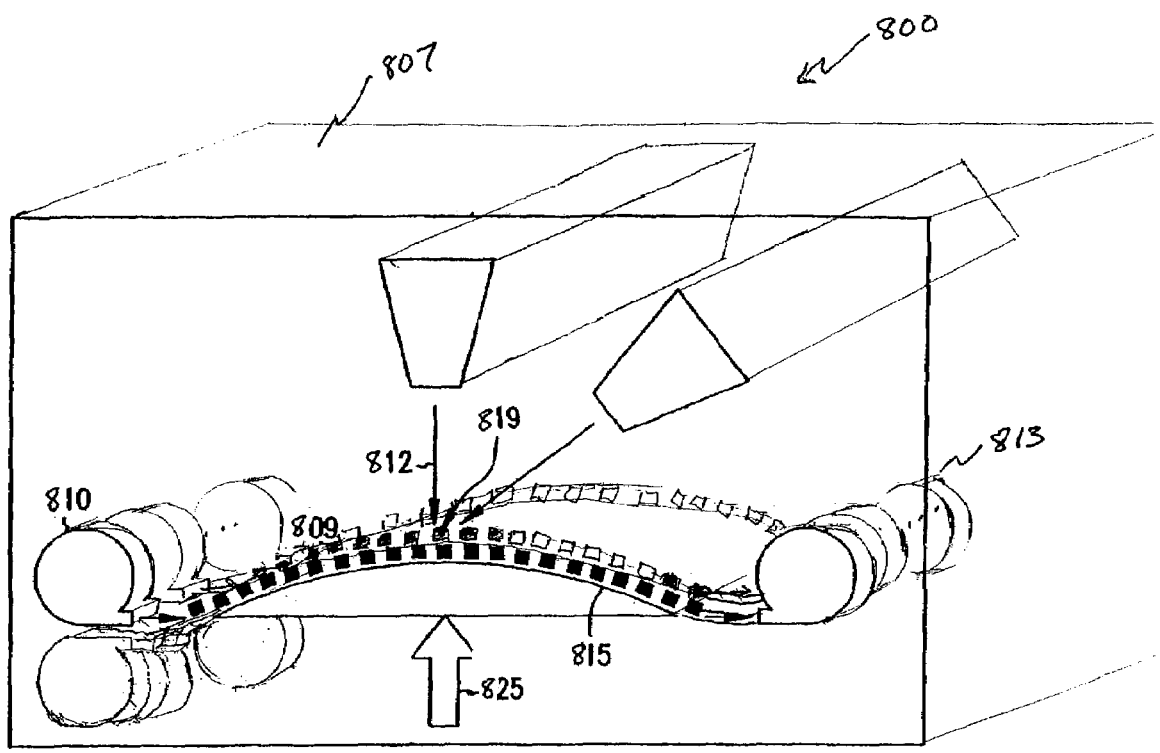
FIG. 8B shows another view of the system for making an RFID device shown in FIG. 8A.

FIG. 8B shows another block diagram view of the system 800. In this view, vacuum chamber 807 holds a plurality of supply reels 810 to feed a plurality of substrates 809 for attachment of peel-and-stick adhesive fed from supply reels 827. The substrates are fed over an arched thermal surface 815 and taken up by a plurality of end rolls 813.

In one embodiment, the supply reels 810 hold strips of different material. In another embodiment, the supply reels 810 hold strips one component wide. Providing multiple supply reels allows the tension and speed of each reel's substrate material to be individually controlled, as well as enabling multiple different component designs to be simultaneously loaded and processed.

In another embodiment, the thermal control surface 815 and the thermal source 825 are provided on a drum and the drum controls the rate of movement of the substrates under the deposition stations 811 and assist source 817. One advantage of using multiple strips of material that are each one component wide is that it alleviates the problem of uneven tension distributed across a drum that is sometimes seen using wide strips with multiple components. In processes involving multiple different component designs all components have to pass over the drum at the same rate. Thus, multiple component designs would otherwise have identical layers and layer thicknesses applied to them.

In another embodiment, the plurality of substrates 809 run in front of the deposition stations 811 and assist sources 817 at different speeds, thus allowing layers of differing thickness to be applied to different strips. In one embodiment, the different speeds are achieved by providing multiple drums for controlling the speed of strips of substrate.

Figure 9A:
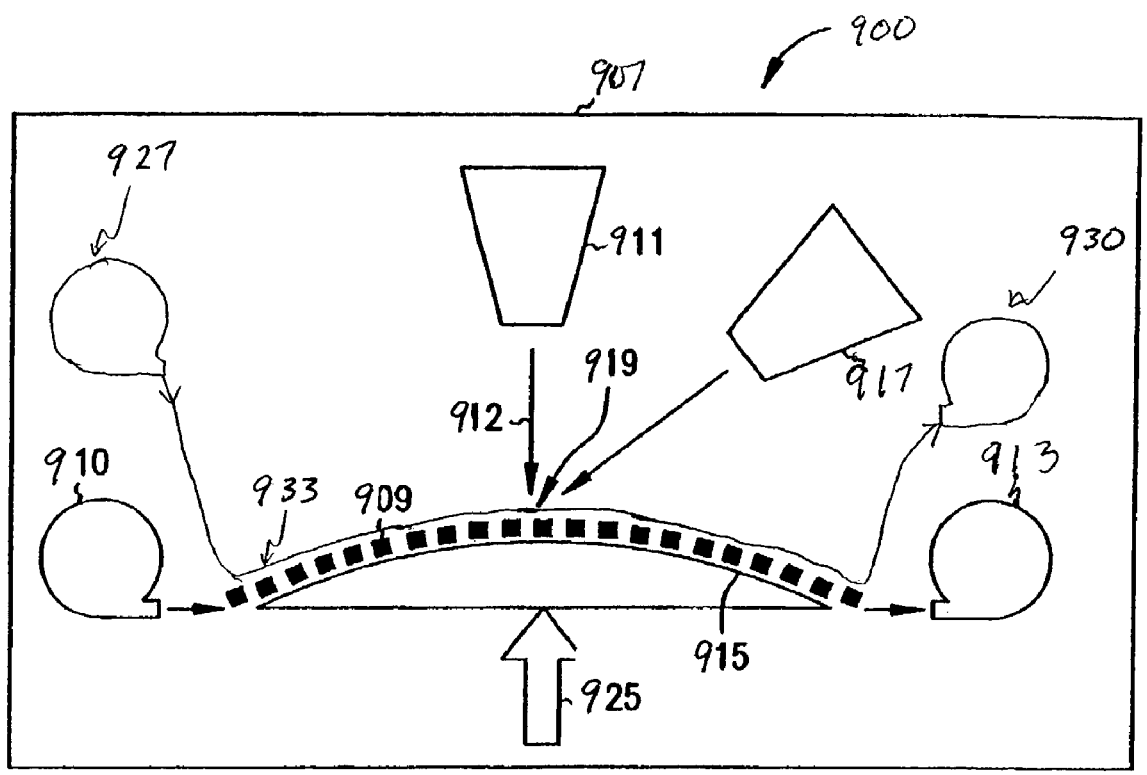
FIG. 9A shows a cross sectional view of another embodiment of a system for making an RFID device.

FIG. 9A shows another system 900 for making an RFID device. The system 900 includes one or more supply reels 910 that feed one or more source substrates 909, one or more deposition stations 911 that deposit layers onto the one or more substrates, one or more assist sources 917, one or more supply reels 927 that feed one or masks 933 for attachment to the one or more substrates, one or more end reels 930 for taking up the mask 933 after deposition, one or more end reels 913 for taking up the formed devices after the substrates are fed over an arched thermal surface 915, and a vacuum chamber 907 that contains the supply reels 910, 927, the end reels 930, 913, the deposition stations 911, and assist sources 917.

Figure 9B:
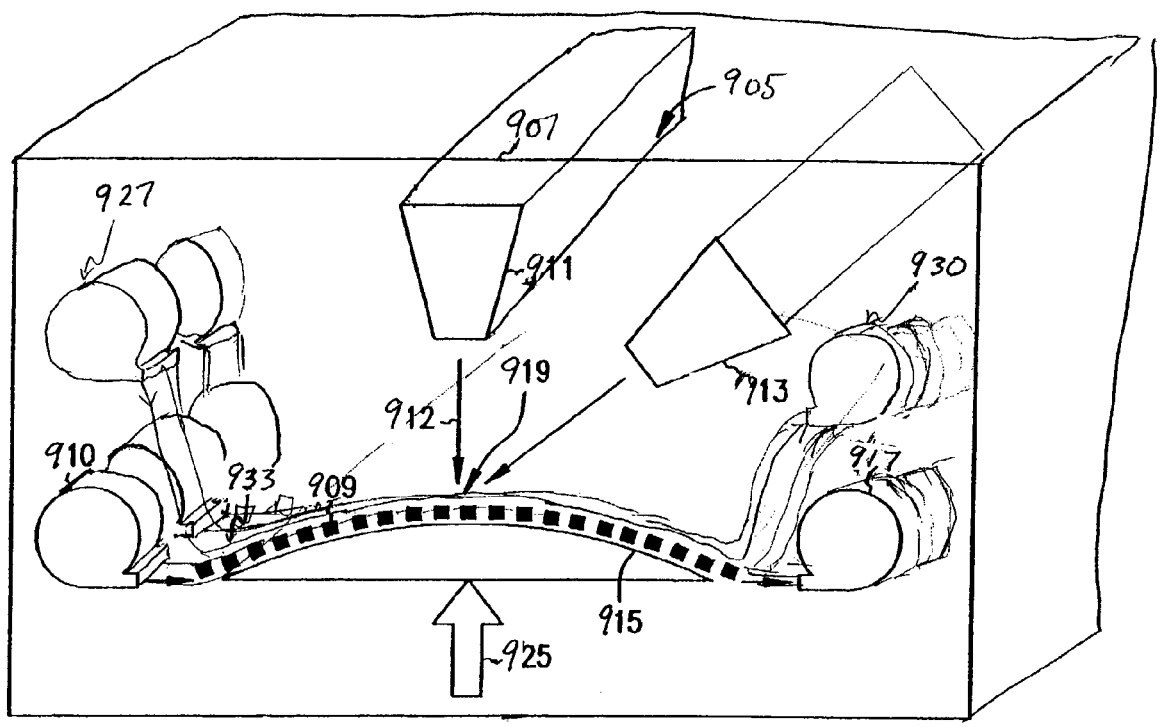
FIG. 9B shows another view of the system for making an RFID device shown in FIG. 9A.

FIG. 9B shows another view of the system 900. A plurality of supply reels 927 holding a plurality of masks 933 would allow a plurality of components to be deposited onto a plurality of substrates 909 in one system 900. By using reel-to-reel masks, the mask used at each station can be easily changed. For example, if four deposition stations are provided, a first set of four masks, each defining its own deposition pattern for each respective station is used at a first time. Later, the mask reel is moved and a second set of four masks is used. This allows the mask patterns to be changed for different devices being made, without having to open the deposition chamber. It also allows changing masks when the mask wears out (for example, by deposition material accumulating on the mask, or by ions etching away the mask).

Another embodiment of the system combines the systems shown in FIGS. 8 and 9 into one system that provides supply reels 827, 927 for applying both an adhesive layer and a mask layer to the source substrates 909.

CONCLUSION

One aspect of the present invention provides a radio-frequency identification (RFID) device having a thin-film battery. A system 100, such as shown in FIG. 1 includes the RFID device 170 in communication with a remote radio frequency (RF) transmitter and/or receiver 160. In one embodiment, the RFID device 170 of the system 100 includes a flexible substrate 110, a thin-film battery 120 deposited on the flexible substrate 110, an electronic circuit 130 placed on the battery 120 and coupled to the battery 120 to provide power, and a Radio Frequency (RF) antenna 140 connected to the electronic circuit 130. In another embodiment the battery 120 of the RFID device 170 is a rechargeable battery, and the battery 120 is recharged when energy is transmitted from the remote device 160. In another embodiment, the RFID device includes an RF-activated switch.

An embodiment of the RFID device 170 that includes an RF-activated switch is shown in FIG. 2A. RF energy is received by the antenna 240 and activates RF-activated switch 250 that places the thin-film battery 220 in communication with the electronic circuit 230. In another embodiment, the RF-activated switch 250 activates the electronic circuit 230 from a low-power sleep mode.

Another aspect of the invention provides a method 500 as shown in FIG. 5A. The method 500 includes providing 510 a flexible peel-and-stick RFID device 100 that includes a multi-bit identifier value and a thin-film battery deposited on a flexible substrate, pressure-adhering 520 the RFID device 100 to an article, receiving 530 RF energy at the RFID device, and based on the reception of the RF energy, coupling 540 battery power to the RFID device 170 to activate circuitry, where the activation initiates 550 a task in the RFID device 170 that includes transmitting an identifier (ID) value based on the multi-bit identifier of the RFID device 170. In another embodiment, such as shown in FIG. 5B, the task is storing 551 a start time for an activity in the RFID device 170. In another embodiment such as shown in FIG. 5C, the task is running 552 a self-check in the RFID device 170 and storing 553 the result of the self-check. In a further embodiment of the method, such as shown in FIG. 5D, the RFID device 170 receives 554 an interrogation code from a remote RF transmitter device 160 and performs 555 an analysis of the interrogation code, and transmits 556 the ID value to a remote RF receiver device 160 based upon the analysis of the interrogation code. In another embodiment, receiving an interrogation code from the remote device causes the RFID device 170 to store 557 a timestamp for an event. In another embodiment such as shown in FIG. 5E, the RFID device 170 stores 557 a first timestamp to mark a shipping event and stores 558 a second timestamp to mark a receiving event, and then compares 559 the stored timestamps to determine the duration of shipping related events.

Another method, such as shown in FIG. 6A, includes forming an RFID device 170. One embodiment of the method 600 includes providing 610 a flexible substrate, depositing 620 a battery that includes an anode, a cathode, and an electrolyte separating the anode and cathode, depositing 630 a wiring layer, placing 640 electronic circuitry on the battery that is connected to the battery, depositing 650 a pressure sensitive adhesive to allow peel-and-stick applications, and covering 660 the RFID device. One embodiment includes arranging the elements of the RFID device as (i) the cover, (ii) the electronic circuit, (iii) the wiring layer, (iv) the battery, (v) the substrate, and (vi) the pressure sensitive adhesive. Other embodiments use different orders or positions of the layers or circuitry. In another embodiment, the method 600 includes forming 670 a printed label onto the RFID device. In another embodiment as shown in FIG. 6B, the battery is deposited 620 on the substrate using energy between about 50 eV to about 95 eV. In another embodiment, the battery is deposited on the substrate using energy between 70 eV to 90 eV. In another embodiment, the battery deposited on the flexible substrate is a rechargeable battery.

Another aspect of the invention provides a flexible peel-and-stick battery-operated device. An embodiment of the device 170 such as shown in FIG. 1 and includes a flexible substrate 110, a thin-film battery 120 deposited on the flexible substrate 110, an electronic circuit 130 placed on the battery 120 and coupled to the battery 120 to provide power to the electronic circuit 130, a Radio Frequency (RF) antenna 140 coupled to the electronic circuit 130, and an adhesive 150 applied to the flexible substrate 110. In another embodiment of the device, the electronic circuit 130 includes an RF-enabled switch that electrically activates the electronic circuit 130. In another embodiment the RF-enabled switch includes a MEMs device. In another embodiment, the RF antenna 140 of the device is integrated into the substrate 110. In another embodiment, the battery 120 of the device is a rechargeable battery. One aspect of forming the RFID devices as shown in FIG. 7 includes a rolled release layer 710 having releasably affixed thereon a plurality of the RFID devices 770.

Another aspect of the invention, such as shown in FIG. 8A, provides a system for making an RFID device. The system includes one or more supply reels 810 that feed one or more source substrates 809, one or more supply reels 810 that feed one or more electronic circuits and an RF antenna, one or more deposition stations 811 that deposit layers onto the one or more substrates, a supply reel 827 that feeds a peel-and-stick adhesive for attachment to the substrate with thermal source 825, and a vacuum chamber 807 that contains the supply reels 810 and the deposition stations 811. The layers deposited in the system include layers to form a battery, and a wiring layer to couple the battery to the electronic circuit layer and to couple the RF antenna to the electronic circuit. The layers deposited to form a battery include (a) a cathode layer, (b) an electrolyte layer, and (c) an anode layer.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A method comprising:
providing a flexible peel-and-stick RFID device that includes a multi-bit identifier value, an RF-activated switch, and a thin-film battery deposited on a flexible substrate;
pressure-adhering the RFID device to an article;
receiving RF energy at the RFID device;
based on the reception of the RF energy, coupling battery power through the RF-activated switch to the RFID device to activate a circuit and initiate a task in the RFID device using the power from the battery, wherein the task includes transmitting an identifier (ID) value based on the multi-bit identifier of the RFID;
receiving an interrogation code into the RFID device from a remote RF transmitter device;
performing an analysis of the interrogation code;
transmitting the ID value from the RFID device to a remote RF receiver device based upon the analysis of the interrogation code;
storing a timestamp for an event based on receiving the interrogation code into the RFID device;
storing a first timestamp to mark a shipping event;
storing a second timestamp to mark a receiving event; and
comparing the first and second stored timestamps to determine the duration of shipping related events.

2. The method of claim 1, wherein the battery is a rechargeable battery, and wherein the method further includes recharging the battery using the received RF energy.

3. The method of claim 1, wherein the task includes:
running a self-check in the RFID device; and
storing the result of the self-check.

4. A flexible peel-and-stick battery-operated device comprising:
a plurality of layers wherein the layers are held to one another as a single package, wherein the layers include:
a flexible substrate;
an electronic circuit and an RF-activated switch;
a thin-film battery deposited as a series of layers, the series of layers including a cathode layer, an electrolyte layer, and an anode layer, operatively coupled by the RF-activated switch upon receipt of RF energy to the electronic circuit to provide power;
a radio frequency (RF) antenna operatively coupled to the electronic circuit; and
a peel-and-stick adhesive layer configured to connect the battery-operated device to a surface, wherein the layers are stacked in the order comprising:
the adhesive layer wherein the adhesive layer is pressure sensitive and covered by a peel-able release layer;
the flexible substrate;
the thin-film battery deposited on the flexible substrate;
the wiring layer including an RF antenna deposited on the previous layers; and
the electronic circuit including an RF-enabled switch deposited on the wiring layer.

5. The device of claim 4, wherein the battery is a rechargeable battery, and wherein device is configured such that the battery is recharged when energy is transmitted from a remote device through the RF antenna and the electronic circuit.

6. The device of claim 4, wherein the electronic circuit includes the RF-activated switch.

7. The device of claim 4, wherein the RF-activated switch includes a MEMS device.

8. The device of claim 4, wherein the RF antenna is integrated into the substrate.

9. The device of claim 4, wherein the battery is rechargeable.

10. A rolled release layer having releasably affixed thereon a plurality of the device according to claim 4.

11. The device of claim 4, further comprising:
a printed label on the device.

12. A system for making an RFID device, the system comprising:
one or more supply reels that feed one or more source substrates;
one or more supply reels that feed one or more electronic circuits, an RF-activated switch, and an RF antenna;
one or more deposition stations that deposit a series of layers onto the one or more substrates, wherein the series of layers include:
(i) layers to form a solid-state lithium-based battery, the battery layers including:
a) a cathode layer;
b) an electrolyte layer;
c) an anode layer;
(ii) a wiring layer to couple the battery to the electronic circuit layer, and to couple the RF antenna to the electronic circuit; and
a supply reel that feeds a peel-and-stick adhesive layer; and
a vacuum chamber that contains the supply reels and the deposition station, wherein the RF-activated switch is operable to connect electrical power and activate the one or more electronic circuits upon receipt of RF energy.

13. The system of claim 12, further comprising one or more stations that deposit the one or more substrates onto a release layer with a single pressure-sensitive adhesive layer therebetween, wherein one face of the adhesive layer is attached to the substrate and an opposite face of the adhesive layer is attached to the release layer.

* * * * *

UNITED STATES PATENT AND TRADEMARK OFFICE
CERTIFICATE OF CORRECTION

| | | |
|---|---|---|
| PATENT NO. | : 7,603,144 B2 | Page 1 of 1 |
| APPLICATION NO. | : 10/336662 | |
| DATED | : October 13, 2009 | |
| INVENTOR(S) | : Jenson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1880 days.

Signed and Sealed this

Fourteenth Day of December, 2010

David J. Kappos
*Director of the United States Patent and Trademark Office*